US009335537B2

(12) United States Patent
Sano

(10) Patent No.: US 9,335,537 B2
(45) Date of Patent: May 10, 2016

(54) VARIABLE WAVELENGTH INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 249 days.

(21) Appl. No.: 13/864,612

(22) Filed: Apr. 17, 2013

(65) Prior Publication Data
US 2013/0279005 A1 Oct. 24, 2013

(30) Foreign Application Priority Data
Apr. 18, 2012 (JP) ................................. 2012-094517

(51) Int. Cl.
*G02B 26/00* (2006.01)
(52) U.S. Cl.
CPC .................... *G02B 26/001* (2013.01)
(58) Field of Classification Search
CPC .............................. G02B 6/29358; G01J 3/26
See application file for complete search history.

(56) References Cited

U.S. PATENT DOCUMENTS

| 2002/0167730 A1* | 11/2002 | Needham et al. ............. 359/578 |
| 2004/0218865 A1* | 11/2004 | Lu ................................... 385/39 |
| 2010/0246010 A1* | 9/2010 | Mitamura ..................... 359/579 |
| 2011/0222157 A1 | 9/2011 | Sano |
| 2012/0008141 A1* | 1/2012 | Matsushita et al. ........... 356/326 |

FOREIGN PATENT DOCUMENTS

| JP | 07-243963 | 9/1995 |
| JP | 2005-031326 | 2/2005 |
| JP | 2011-053510 | 3/2011 |
| JP | 2011-191492 | 9/2011 |

* cited by examiner

*Primary Examiner* — Kimberly N Kakalec
(74) *Attorney, Agent, or Firm* — Harness, Dickey & Pierce, P.L.C.

(57) ABSTRACT

A variable wavelength interference filter includes a stationary substrate provided with a stationary reflecting film, a movable substrate provided with a movable reflecting film, a first electrostatic actuator, and a second electrostatic actuator which can be driven independently of the first electrostatic actuator, two first partial actuators constituting the first electrostatic actuator have the same shape as each other in the plan view, and are arranged at regular angular intervals and with the same distance with respect to the filter center point, and two second partial actuators constituting the second electrostatic actuator have the same shape as each other in the plan view, and are arranged at regular angular intervals and with the same distance with respect to the filter center point.

14 Claims, 17 Drawing Sheets

| No | TRANS-MISSION PEAK WAVELENGTH | GAP AMOUNT | FIRST ELECTROSTATIC ACTUATOR ||| SECOND ELECTROSTATIC ACTUATOR |||
|---|---|---|---|---|---|---|---|---|
| | | | APPLIED VOLTAGE | PERIOD | VOLTAGE VARIATION | APPLIED VOLTAGE | PERIOD | VOLTAGE VARIATION |
| 1 | $\lambda 0$ | g0 | V11 | T11 | — | 0 | — | — |
| 2 | $\lambda 1$ | g1 | V12 | T12 | $\Delta$V11 | 0 | — | — |
| 3 | $\lambda 2$ | g2 | V13 | T13 | $\Delta$V12 | 0 | — | — |
| 4 | $\lambda 3$ | g3 | V14 | T14 | $\Delta$V13 | 0 | — | — |
| 5 | $\lambda 4$ | g4 | V15 | T15 | $\Delta$V14 | 0 | — | — |
| 6 | $\lambda 5$ | g5 | V15 | T21 | — | V21 | T21 | — |
| 7 | $\lambda 6$ | g6 | V15 | T22 | — | V22 | T22 | $\Delta$V21 |
| 8 | $\lambda 7$ | g7 | V15 | T23 | — | V23 | T23 | $\Delta$V22 |
| 9 | $\lambda 8$ | g8 | V15 | T24 | — | V24 | T24 | $\Delta$V23 |

FIG. 7

VARIABLE WAVELENGTH INTERFERENCE FILTER, OPTICAL FILTER DEVICE, OPTICAL MODULE, AND ELECTRONIC APPARATUS

BACKGROUND

1. Technical Field

The present invention relates to a variable wavelength interference filter, an optical filter device, an optical module, and an electronic apparatus.

2. Related Art

A known variable wavelength interference filter has a pair of reflecting films opposed to each other and varies the distance between the reflecting films to thereby emit light having a predetermined wavelength (see, e.g., JP-A-7-243963).

The variable wavelength interference filter (the optical resonator) described in JP-A-7-243963 is provided with a first substrate and a second substrate opposed to each other, high reflecting films provided to the respective substrates and opposed to each other across an inter-reflecting film gap, and electrodes provided to the respective substrates and opposed to each other. In such a variable wavelength interference filter, by applying a voltage between the electrodes it becomes possible to deform the second substrate to thereby control the inter-reflecting film gap.

In the variable wavelength interference filter according to JP-A-7-243963 described above, the inter-reflecting film gap is controlled with a single electrostatic actuator composed of a pair of electrodes. As a result, there is a problem that a variation in gap amount of the inter-reflecting film gap might occur due to a variation in drive voltage caused by noise or the like which degrades the accuracy of the gap control of the inter-reflecting film gap.

SUMMARY

An advantage of some aspects of the invention is to provide a variable wavelength interference filter, an optical filter device, an optical module, and an electronic apparatus capable of controlling the inter-reflecting film gap with high accuracy.

A variable wavelength interference filter according to an aspect of the invention includes a first substrate, a second substrate opposed to the first substrate, a first reflecting film provided to the first substrate, a second reflecting film provided to the second substrate, and opposed to the first reflecting film across an inter-reflecting film gap, a first actuator disposed outside an optical interference region where the first reflecting film and the second reflecting film overlap each other in a plan view of the first substrate and the second substrate viewed from a substrate thickness direction, and adapted to vary the inter-reflecting film gap, and a second actuator disposed outside the optical interference region in the plan view, and driven independently of the first actuator to vary the inter-reflecting film gap, the first actuator includes a plurality of first partial actuators having the same shape as each other in the plan view, and disposed at positions with regular angular intervals with respect to a center point of the optical interference region and with the same distance from the center point as each other, and the second actuator includes a plurality of second partial actuators having the same shape as each other in the plan view, and disposed at positions with regular angular intervals with respect to the center point of the optical interference region and with a same distance from the center point as each other.

Here, the "same shape," the "regular angular interval," and the "same distance" described in the invention include a small error provided the parallelism between the reflecting films is maintained.

In this aspect of the invention, the first actuator and the second actuator, which can be independently driven, are disposed outside the optical interference region where the first reflecting film and the second reflecting film overlap each other. In such a configuration as described above, it is possible to drive the first actuator and the second actuator independently of each other. Therefore, it is possible to perform finer voltage setting, and to perform accurate control of the inter-reflecting film gap compared to the case of controlling the inter-reflecting film gap using a single electrostatic actuator.

Incidentally, as a configuration of disposing the two actuators outside the optical interference region, it is possible to adopt the configuration of, for example, disposing inner electrodes each having an annular shape outside the optical interference region of the first and second substrates, disposing arc-like (e.g., C-shaped) outer electrodes, each of which has a part provided with a slit, outside the inner electrodes, and disposing extraction electrodes of the inner electrodes in the slits of the outer electrodes. However, according to such a configuration, the electrostatic attractive force of the electrostatic actuator formed of the outer electrodes does not act in the position where the slit is disposed. Therefore, it is possible that the parallelism between the first reflecting film and the second reflecting film is degraded when the electrostatic actuator formed of the outer electrodes is driven.

In contrast, in this aspect of the invention, since the plurality of first partial actuators constituting the first actuator have the same shape as each other, the electrostatic attractive forces acting on the respective first partial actuators become to have the same level. Further, since these first partial actuators are arranged at positions with regular angular intervals with respect to the center point of the optical interference region, and with the same distance from the center point as each other, it results that the electrostatic attractive force acts in a balanced manner with respect to the center of the optical interference region.

Similarly, the plurality of second partial actuators constituting the second actuator has the same shape as each other, and is arranged at positions with regular angular intervals with respect to the center point of the optical interference region, and with the same distance from the center point as each other. Therefore, the electrostatic attractive force due to the second actuator also acts in a balanced manner with respect to the center of the optical interference region.

Thus, it is possible to deflect the first substrate or the second substrate in a balanced manner with respect to the center of the optical interference region, and it becomes possible to vary the inter-reflecting film gap in the state of keeping the parallelism between the first reflecting film and the second reflecting film, and it becomes possible to perform the gap control of the inter-reflecting film gap in a more accurate manner.

In the variable wavelength interference filter according to the aspect of the invention, it is preferable that the first actuator and the second actuator are disposed on a circumference of a circle having a center in a part of the optical interference region in the plan view.

In this configuration, the first actuator and the second actuator are arranged on a circumference of the same circle. According to such a configuration, miniaturization of the variable wavelength interference filter can be achieved compared to the configuration in which, for example, the first actuator and the second actuator are arranged on the respective circumferences different from each other.

In the variable wavelength interference filter according to the aspect of the invention, it is preferable that there are further included a first electrode provided to the first substrate, a second electrode provided to the first substrate, a third electrode provided to the second substrate, and opposed to the first electrode, and a fourth electrode provided to the second substrate, and opposed to the second electrode, the first electrode includes a plurality of first partial electrodes disposed outside the optical interference region in the plan view, a first connection electrode adapted to connect the first partial electrodes to each other, and a first extraction electrode connected to at least one of the first partial electrodes and the first connection electrode, the second electrode includes a plurality of second partial electrodes disposed outside the optical interference region in the plan view, a second connection electrode adapted to connect the second partial electrodes to each other, and a second extraction electrode connected to at least one of the second partial electrodes and the second connection electrode, at least one of the first partial actuators is formed of a region where the first partial electrode and the third electrode overlap each other in the plan view, and at least one of the second partial actuators is formed of a region where the second partial electrode and the fourth electrode overlap each other in the plan view.

In this configuration, the first electrode is provided with a plurality of first partial electrodes constituting the first partial actuators together with the third electrode, a first connection electrode for connecting these first partial electrodes, and a first extraction electrode. In such a configuration, the first partial electrodes are connected to each other by the first connection electrode. Therefore, by setting an electrical potential to the first extraction electrode, it is possible to set the first partial electrodes to the same electrical potential, and thus the simplification of the wiring structure can be achieved.

Similarly, the second electrode is provided with a plurality of second partial electrodes constituting the second partial actuators together with the fourth electrode, a second connection electrode for connecting these second partial electrodes, and a second extraction electrode. Therefore, by setting an electrical potential to the second extraction electrode, it is possible to set the second partial electrodes to the same electrical potential, and thus the simplification of the wiring structure can be achieved.

In the variable wavelength interference filter according to the aspect of the invention, it is preferable that the first partial actuators are each formed of either one of the region where the first partial electrode and the third electrode overlap each other in the plan view and a region where at least a part of the first connection electrode and the third electrode overlap each other in the plan view.

In general, in view of the simplification of the configuration and the miniaturization of the variable wavelength interference filter, it is preferable to adopt a simple electrode shape as the electrode shape of each of the electrodes constituting the first actuator and the second actuator. However, in particular in the case in which three or more first partial electrodes are disposed, if the electrode shape is simplified, it might be difficult to adopt a configuration in which the first connection electrode and the third electrode are not opposed to each other. In contrast, in the configuration described above, the regions where the first connection electrode and the third electrode overlap each other are also arranged to have the same distance from the center point of the optical interference region, and regular angular intervals, and have the same shape as each other. Therefore, similarly to the configuration described before, it is possible to also make the electrostatic attractive force due to the first actuator act in a balanced manner with respect to the center of the optical interference region. Further, since the electrode shape can be simplified, miniaturization of the variable wavelength interference filter can be achieved.

In the variable wavelength interference filter according to the aspect of the invention, it is preferable that the second partial actuators are each formed of either one of the region where the second partial electrode and the fourth electrode overlap each other in the plan view and a region where at least a part of the second connection electrode and the fourth electrode overlap each other in the plan view.

Also in this configuration, similarly to the configuration described above, the regions where the second connection electrode and the fourth electrode overlap each other are also arranged to have the same distance from the center point of the optical interference region, and regular angular intervals, and have the same shape as each other. Therefore, it is possible to make the electrostatic attractive force due to the second electrostatic actuator act in a balanced manner with respect to the center of the optical interference region, and by the simplification of the electrode shape, miniaturization of the variable wavelength interference filter can be achieved.

In the variable wavelength interference filter according to the aspect of the invention, it is preferable that at least one of the first partial actuators is formed of an annular opposed region where a part of the first connection electrode and the third electrode overlap each other in the plan view, and the annular opposed region has an annular shape centered on the center point of the optical interference region in the plan view.

In this configuration, in the case in which the first connection electrode has an annular portion, by making the annular portion be opposed to the third electrode, it is possible to provide the first actuator with the annular opposed region. Such an annular opposed region has a symmetrical shape about the center point of the optical interference region. Therefore, even in the case in which the first actuator is provided with an annular actuator formed of the annular opposed region in addition to the plurality of first partial actuators described above, it is possible to make the electrostatic attractive force act in a balanced manner, and thus, the inter-reflecting film gap can be accurately controlled without tilting the reflecting film.

In the variable wavelength interference filter according to the aspect of the invention, it is preferable that the second substrate includes a movable section provided with the second reflecting film, a holding section disposed outside the movable section, and adapted to hold the movable section so as to be able to move back and forth with respect to the first substrate, and a substrate peripheral section disposed outside the holding section and having a bond region to be bonded to the first substrate, and a non-bond region opposed to the first substrate across a predetermined gap, and at least either one of the first connection electrode and the second connection electrode is disposed so as to be opposed to the non-bond region in the substrate peripheral section of the second substrate.

In this configuration, the second substrate has a movable section, a holding section, and a substrate peripheral section, and the substrate peripheral section is provided with a non-bonding section opposed to the first substrate across a predetermined gap. Such a non-bonding section is a portion located outside the holding section, and the amount of the deflection of the non-bonding section can be set to an extremely small value compared to the holding section even in the case in which the electrostatic attractive force is generated. Therefore, by disposing the first connection electrode and the second connection electrode to the non-bonding section of the substrate peripheral section, the deflection of the substrate due to the electrostatic attractive force thus generated can be suppressed even if these connection electrodes are opposed to the third electrode or the fourth electrode in the non-bonding section.

In the variable wavelength interference filter according to the aspect of the invention, it is preferable that the third electrode is provided with a plurality of third partial electrodes disposed outside the optical interference region and overlapping the first partial electrodes in the plan view, and a third connection electrode adapted to connect the third partial electrodes to each other, the fourth electrode is provided with a plurality of fourth partial electrodes disposed outside the optical interference region and overlapping the second partial electrodes in the plan view, and a fourth connection electrode adapted to connect the fourth partial electrodes to each other, and at least either one of the third connection electrode and the fourth connection electrode is disposed in the non-bond region in the substrate peripheral section.

In this configuration, the third electrode is also provided with a plurality of third partial electrodes and a third connection electrode similarly to the first electrode. Further, the fourth electrode is also provided with a plurality of fourth partial electrodes and a fourth connection electrode similarly to the second electrode. According also to such a configuration, even if either one of the third connection electrode and the fourth connection electrode is provided to the non-bonding section of the substrate peripheral section, and thus the connection electrode is opposed to the first connection electrode or the second connection electrode in the non-bonding section, or opposed to the first extraction electrode or the second extraction electrode, the deflection of the substrate due to the electrostatic attractive force thus generated can be suppressed.

In the variable wavelength interference filter according to the aspect of the invention, it is preferable that the third electrode is provided with a plurality of third partial electrodes disposed outside the optical interference region and overlapping the first partial electrodes in the plan view, a third connection electrode adapted to connect the third partial electrodes to each other, and a third extraction electrode connected to at least one of the third partial electrodes and the third connection electrode, the fourth electrode is provided with a plurality of fourth partial electrodes disposed outside the optical interference region and overlapping the second partial electrodes in the plan view, a fourth connection electrode adapted to connect the fourth partial electrodes to each other, and a fourth extraction electrode connected to at least one of the fourth partial electrodes and the fourth connection electrode, the first extraction electrode is disposed at a position, which fails to overlap the third extraction electrode and the fourth extraction electrode in the plan view, and the second extraction electrode is disposed at a position, which fails to overlap the third extraction electrode and the fourth extraction electrode in the plan view.

In this configuration, the first extraction electrode, the second extraction electrode, the third extraction electrode, and the fourth extraction electrode are disposed at the respective positions not overlapping each other in the plan view. Therefore, it is possible to suppress the generation of the electrostatic attractive force in these extraction electrodes to thereby suppress the tilt of the reflecting film.

In the variable wavelength interference filter according to the aspect of the invention, it is preferable that the third electrode and the fourth electrode are formed of a single (continuous) common electrode having an annular shape.

In this configuration, since the third electrode and the fourth electrode are formed of a single annular common electrode, the shape of the electrodes provided to the second substrate can be simplified. Specifically, the connection electrodes become unnecessary, and the number of extraction electrodes can be decreased to one. Thus, the area of the part for forming the electrodes can be reduced, and thus, miniaturization of the variable wavelength interference filter can be achieved.

In the variable wavelength interference filter according to the aspect of the invention, it is preferable that the first actuator and the second actuator are each an electrostatic actuator.

In this configuration, an electrostatic actuator is used as the first actuator and the second actuator. Such an electrostatic actuator is capable of easily varying the inter-reflecting film gap using the electrostatic attractive force by applying a predetermined voltage between the electrodes opposed to each other, and thus, simplification of the configuration can be achieved.

An optical filter device according to another aspect of the invention includes a variable wavelength interference filter including a first substrate, a second substrate opposed to the first substrate, a first reflecting film provided to the first substrate, a second reflecting film provided to the second substrate, and opposed to the first reflecting film across an inter-reflecting film gap, a first actuator disposed outside an optical interference region where the first reflecting film and the second reflecting film overlap each other in a plan view of the first substrate and the second substrate viewed from a substrate thickness direction, and adapted to vary the inter-reflecting film gap, and a second actuator disposed outside the optical interference region in the plan view, and adapted to vary the inter-reflecting film gap independently of the first actuator, and a housing adapted to house the variable wavelength interference filter, the first actuator includes a plurality of first partial actuators having the same shape as each other in the plan view, and disposed at positions with regular angular intervals with respect to a center point of the optical interference region and with the same distance from the center point as each other, and the second actuator includes a plurality of second partial actuators having the same shape as each other in the plan view, and disposed at positions with regular angular intervals with respect to the center point of the optical interference region and with the same distance from the center point as each other.

In this aspect of the invention, similarly to the aspects of the invention described above, the highly accurate gap control of the inter-reflecting film gap can be performed in the variable wavelength interference filter. In addition thereto, since the variable wavelength interference filter is housed in the housing, it is possible to protect the variable wavelength interference filter from an external impact. Further, invasion of charged particles from the outside can be suppressed by the housing, and it is possible to inhibit the electrodes constituting the first actuator and the second actuator and the reflecting films from being charged, and thus, more accurate gap control of the inter-reflecting film gap can be performed.

An optical module according to still another aspect of the invention includes a first substrate, a second substrate opposed to the first substrate, a first reflecting film provided to the first substrate, a second reflecting film provided to the second substrate, and opposed to the first reflecting film across an inter-reflecting film gap, a first actuator disposed outside an optical interference region where the first reflecting film and the second reflecting film overlap each other in a plan view of the first substrate and the second substrate viewed from a substrate thickness direction, and adapted to vary the inter-reflecting film gap, a second actuator disposed outside the optical interference region in the plan view, and adapted to vary the inter-reflecting film gap independently of the first actuator, and a voltage control section adapted to apply voltages to the first actuator and the second actuator, the first actuator includes a plurality of first partial actuators having the same shape as each other in the plan view, and disposed at positions with regular angular intervals with respect to a center point of the optical interference region and with the same distance from the center point as each other, and the second actuator includes a plurality of second partial actuators having the same shape as each other in the plan view, and disposed at positions with regular angular intervals with respect to the center point of the optical interference region and with the same distance from the center point as each other.

In this aspect of the invention, the first actuator and the second actuator can be independently driven by the voltage control section, and thus, the accurate gap control of the inter-reflecting film gap can be performed in the variable wavelength interference filter.

In the optical module according to the aspect of the invention, it is preferable that the voltage control section applies a first voltage to the first actuator, and then applies a second voltage to the second actuator.

In this configuration, the first voltage is applied to the first actuator to thereby vary the inter-reflecting film gap as much as a gap amount corresponding to the first voltage, and then the second voltage is applied to thereby vary the inter-reflecting film gap to the target gap amount. Thus, the vibration of the substrate caused when varying the inter-reflecting film gap can be more promptly converged, and thus, it is possible to promptly take out the light with the target wavelength.

In the optical module according to the aspect of the invention, it is preferable that the voltage control section applies the second voltage to the second actuator in a state of keeping applying the first voltage to the first actuator.

In this configuration, the second voltage is applied to the second actuator in the state in which the first voltage is applied to the first actuator. In other words, it results that the first actuator and the second actuator vary the gap amount of the inter-reflecting film gap. According to such gap control, the applied voltage to the second actuator can be decreased compared to the case of, for example, applying the first voltage to the first actuator, then stopping applying the voltage to the first actuator, and then applying the second voltage to the second actuator. Therefore, the vibration of the substrate generated when driving the second actuator can be reduced, and thus, the light with the target wavelength can be more promptly taken out.

Further, the voltages to be applied to the first actuator and the second actuator can more finely be controlled compared to the case of varying the inter-reflecting film gap by applying a high voltage to a single actuator, and thus, the influence of the noise depending on the power fluctuation and the environment can be suppressed. Thus, the accurate gap control of the inter-reflecting film gap can be performed.

In the optical module according to the aspect of the invention, it is preferable that the voltage control section switches the voltage to be applied to the first actuator to higher voltages up to the first voltage in a step-by-step manner, and switches the voltage to be applied to the second actuator to higher voltages up to the second voltage in a step-by-step manner.

In this configuration, the voltage to be applied to the first actuator is switched from a low voltage to a higher voltage, and thus varied in a step-by-step manner. Thus, it is possible to promptly converge the vibration of the substrate caused when driving the first actuator.

Further, by subsequently applying the second voltage to the second actuator while keeping the voltage applied to the first actuator in the first voltage, the vibration of the substrate caused when driving the second actuator can be suppressed similarly to the configuration described before. Further, by varying the applied voltage from a low voltage to a higher voltage in a step-by-step manner when driving the second actuator, the vibration of the substrate generated when driving the second actuator can more dramatically be reduced. Thus, the light with the target wavelength can be more promptly taken out from the variable wavelength interference filter.

In the optical module according to the aspect of the invention, it is preferable that the voltage control section increases a period for which a predetermined voltage is applied to the first actuator every time the voltage to be applied to the first actuator is switched to a higher voltage, and increases a period for which a predetermined voltage is applied to the second actuator every time the voltage to be applied to the second actuator is switched to a higher voltage.

In this configuration, the application period of the voltage to be applied to the first actuator or the second actuator after switching the voltage is set to be longer than the application period of the voltage applied to the first actuator or the second actuator before switching the voltage every time the voltage to be applied to the first actuator or the second actuator is switched.

In general, in the actuator, since the substrate is more greatly deflected as the voltage to be applied to the actuator is increased, the restoring force of the substrate also increases, and the time until the vibration stops also increases. In contrast, in the configuration described above, the voltage application period is elongated as the applied voltages to the first and second actuators are increased. Thus, it results that the voltage is switched to the subsequent voltage in the state in which the vibration of the substrate is attenuated to some extent, and thus, the convergence of the vibration can be accelerated compared to the case in which a higher voltage is applied in the state in which the vibration of the substrate is hardly attenuated. Thus, the light with the target wavelength can be more promptly taken out from the variable wavelength interference filter.

In the optical module according to the aspect of the invention, it is preferable that the voltage control section decreases a voltage variation in switching the voltage to be applied to the first actuator every time the voltage is switched to a higher voltage, and decreases a voltage variation in switching the voltage to be applied to the second actuator every time the voltage is switched to a higher voltage.

In this configuration, the voltage control section decreases a voltage variation in switching the voltages to be applied to the first and second actuators every time the voltages are switched to higher voltages. In other words, the voltage control section gradually decreases the voltage variation in switching the voltage every time the voltage switching is performed.

In particular, if the electrostatic actuator is used as the first and second actuators, in the case of deflecting the substrate to decrease the inter-reflecting film gap, the gap variation (the sensitivity) with respect to the voltage variation increases as the voltage applied to the electrostatic actuator increases. Therefore, if the voltage is switched at regular intervals, in the area where the high voltage is applied, the amplitude of the vibration of the substrate also increases, and there might arise the problem such as increase in time required for convergence of the vibration, or contact between the reflecting films due to overshooting.

In contrast, in the configuration described above, the voltage variation of the applied voltages to the first and second actuators is decreased every time the voltage is switched. Thus, the reduction of the time required for the convergence of the vibration described above can be achieved, and the problem of overshooting can also be resolved.

In the optical module according to the aspect of the invention, it is preferable that there is further included a detection section adapted to detect the light taken out by the optical interference region.

In this configuration, as described above, the prompt and accurate gap control of the inter-reflecting film gap can be performed by the voltage control section. Therefore, the prompt and accurate detection of the light intensity of the light with the target wavelength can be performed.

An electronic apparatus according to yet another aspect of the invention includes a variable wavelength interference filter including a first substrate, a second substrate opposed to the first substrate, a first reflecting film provided to the first substrate, a second reflecting film provided to the second substrate, and opposed to the first reflecting film across an inter-reflecting film gap, a first actuator disposed outside an optical interference region where the first reflecting film and the second reflecting film overlap each other in a plan view of the first substrate and the second substrate viewed from a substrate thickness direction, and adapted to vary the inter-reflecting film gap, and a second actuator disposed outside the optical interference region in the plan view, and adapted to vary the inter-reflecting film gap independently of the first actuator, and a control section adapted to control the variable wavelength interference filter, the first actuator includes a plurality of first partial actuators having the same shape as each other in the plan view, and disposed at positions with regular angular intervals with respect to a center point of the optical interference region and with the same distance from the center point as each other, and the second actuator includes a plurality of second partial actuators having the same shape as each other in the plan view, and disposed at positions with regular angular intervals with respect to the center point of the optical interference region and with the same distance from the center point as each other.

In this aspect of the invention, the light with the accurate target wavelength based on the inter-reflecting film gap controlled with high accuracy can be taken out from the optical interference region, and the electronic apparatus can perform an accurate process based on the light.

A variable wavelength interference filter according to still yet another aspect of the invention includes a first substrate, a second substrate opposed to the first substrate, a first reflecting film provided to the first substrate, a second reflecting film provided to the second substrate, and opposed to the first reflecting film across an inter-reflecting film gap, a first actuator disposed outside an optical interference region where the first reflecting film and the second reflecting film overlap each other in a plan view of the first substrate and the second substrate viewed from a substrate thickness direction, and adapted to vary the inter-reflecting film gap, and a second actuator disposed outside the optical interference region in the plan view, and driven independently of the first actuator to vary the inter-reflecting film gap, and the first actuator and the second actuator are disposed on a circumference of a circle having a center in a part of the optical interference region in the plan view.

In this aspect of the invention, the first actuator and the second actuator, which can be driven independently of each other, are disposed on the same circumference. In this case, by controlling the drive of the first actuator and the second actuator, the accuracy of the gap control can be improved compared to the case of controlling the inter-reflecting film gap only by a single actuator.

A variable wavelength interference filter according to further another aspect of the invention includes a first reflecting film, a second reflecting film opposed to the first reflecting film across an inter-reflecting film gap, a first actuator disposed outside an optical interference region where the first reflecting film and the second reflecting film overlap each other in a plan view viewed from a direction perpendicular to the first reflecting film and the second reflecting film, and adapted to vary the inter-reflecting film gap, and a second actuator disposed outside the optical interference region in the plan view, and driven independently of the first actuator to vary the inter-reflecting film gap, the first actuator includes a plurality of first partial actuators having the same shape as each other in the plan view, and disposed at positions with regular angular intervals with respect to a center point of the optical interference region and with the same distance from the center point as each other, and the second actuator includes a plurality of second partial actuators having the same shape as each other in the plan view, and disposed at positions with regular angular intervals with respect to the center point of the optical interference region and with the same distance from the center point as each other.

In this aspect of the invention, similarly to the aspect of the invention, by independently driving the first actuator and the second actuator, the control of the inter-reflecting film gap can be accurately performed.

Further, since the plurality of first partial actuators constituting the first actuator have the same shape as each other, and are arranged at positions with regular angular intervals with respect to the center point of the optical interference region, and with the same distance from the center point as each other, it results that the electrostatic attractive force acts in a balanced manner with respect to the center of the optical interference region. Similarly, the plurality of second partial actuators constituting the second actuator have the same shape as each other, and are arranged at positions with regular angular intervals with respect to the center point of the optical interference region, and with the same distance from the center point as each other. Therefore, the electrostatic attractive force due to the second electrostatic actuator also acts in a balanced manner with respect to the center of the optical interference region.

Thus, it is possible to deflect the first substrate or the second substrate in a balanced manner with respect to the center of the optical interference region, and it becomes possible to vary the inter-reflecting film gap in the state of keeping the parallelism between the first reflecting film and the second reflecting film, and it becomes possible to perform the gap control of the inter-reflecting film gap in a more accurate manner.

BRIEF DESCRIPTION OF THE DRAWINGS

The invention will be described with reference to the accompanying drawings, wherein like numbers reference like elements.

FIG. 7 is a diagram showing an example of voltage table data with respect to a target wavelength.

DESCRIPTION OF EXEMPLARY EMBODIMENTS

First Embodiment

A first embodiment of the invention will hereinafter be explained with reference to the accompanying drawings.
Configuration of Spectroscopic Measurement Device FIG. 1 is a block diagram showing a schematic configuration of a spectroscopic measurement device according to the first embodiment of the invention.

The spectroscopic measurement device 1 is an electronic apparatus according to an embodiment of the invention, and analyzes the light intensity of a predetermined wavelength in the measurement target light reflected by a measurement target X, and measures the dispersion spectrum.

Figure 1:
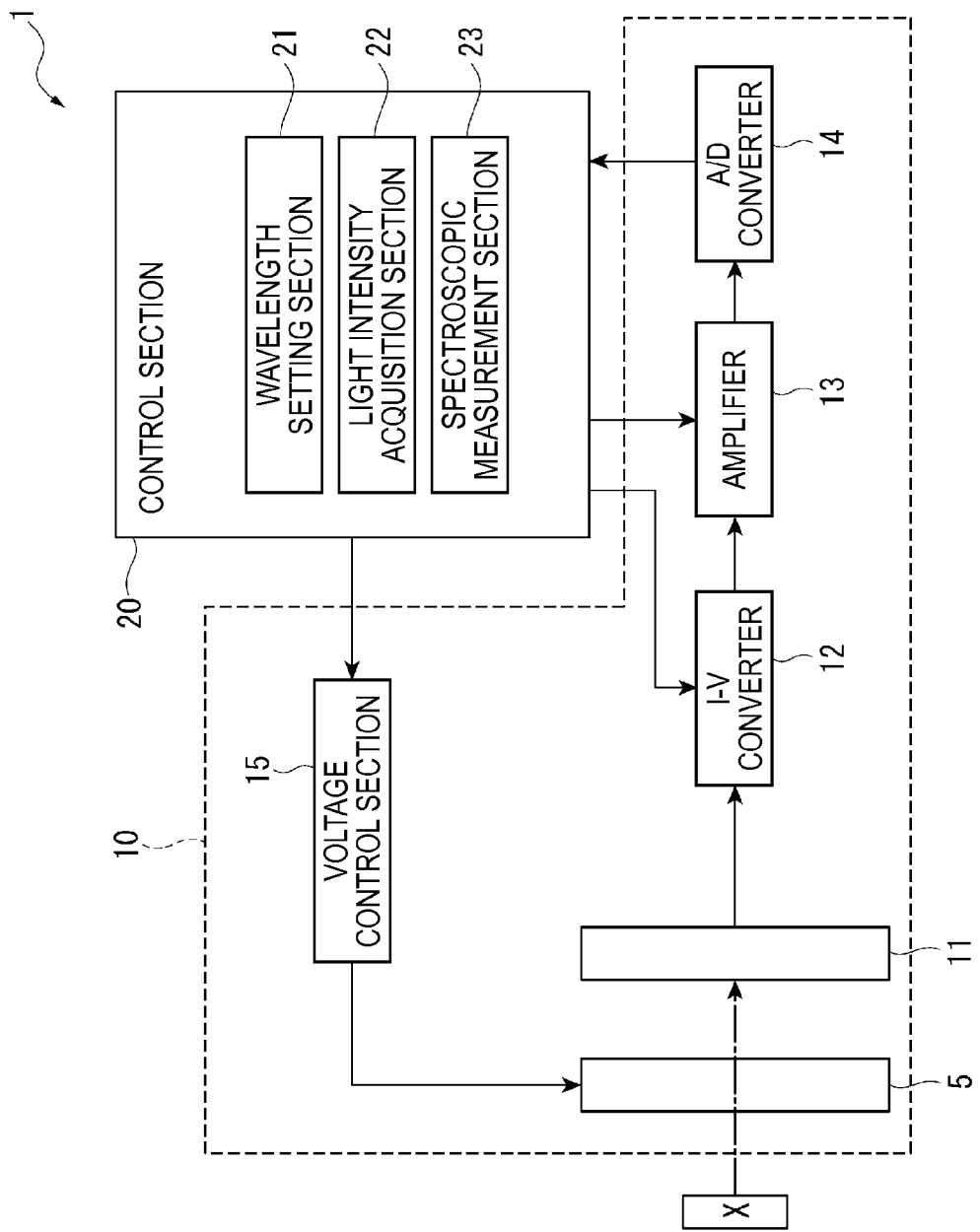
FIG. 1 is a block diagram showing a schematic configuration of a spectroscopic measurement device according to a first embodiment of the invention.

As shown in FIG. 1, the spectroscopic measurement device 1 is provided with an optical module 10, and a control section 20.
Configuration of Optical Module Next, the configuration of the optical module 10 will hereinafter be explained.

Figure 2:
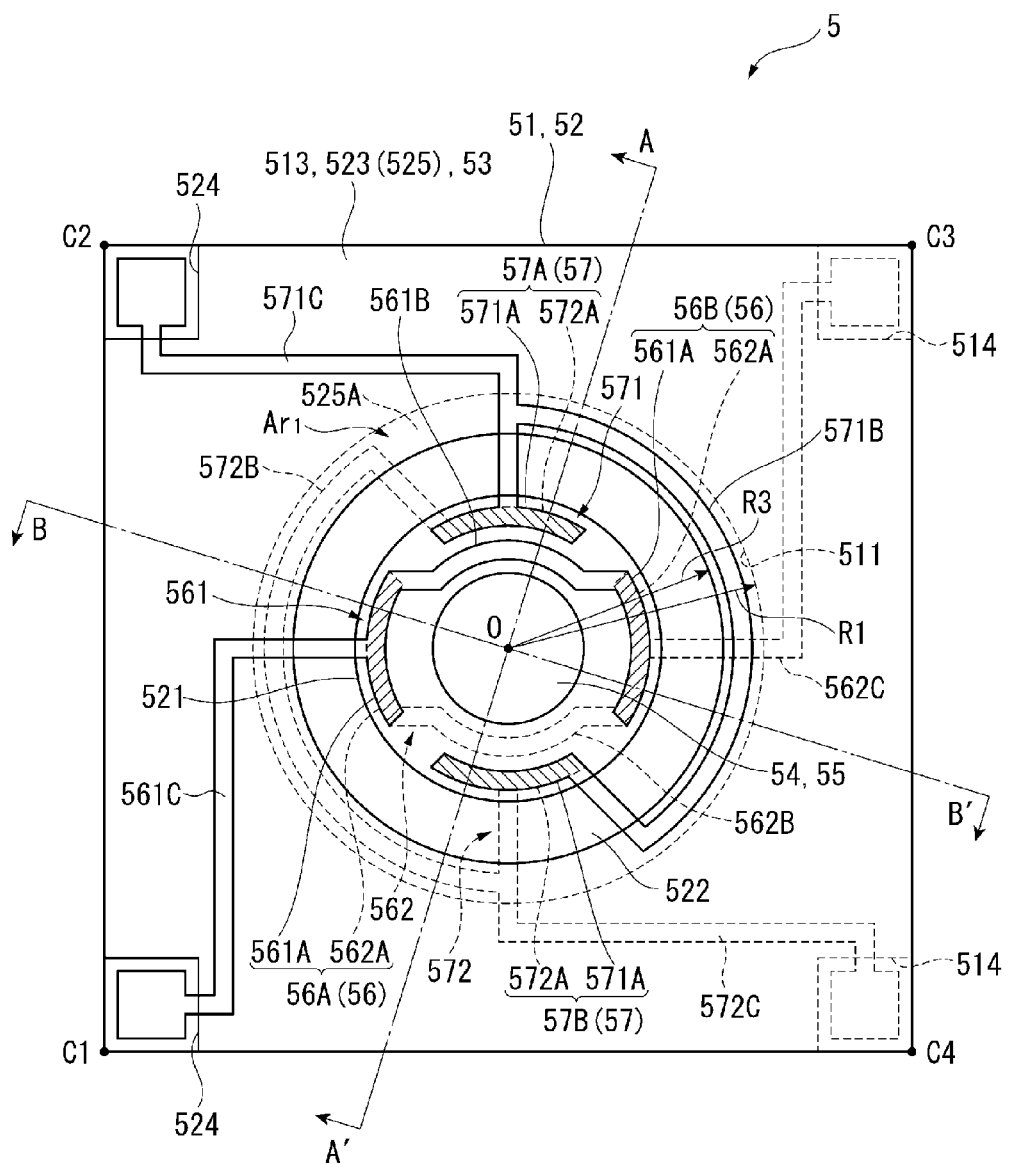
FIG. 2 is a plan view showing a schematic configuration of a variable wavelength interference filter according to the first embodiment.
Figure 3:
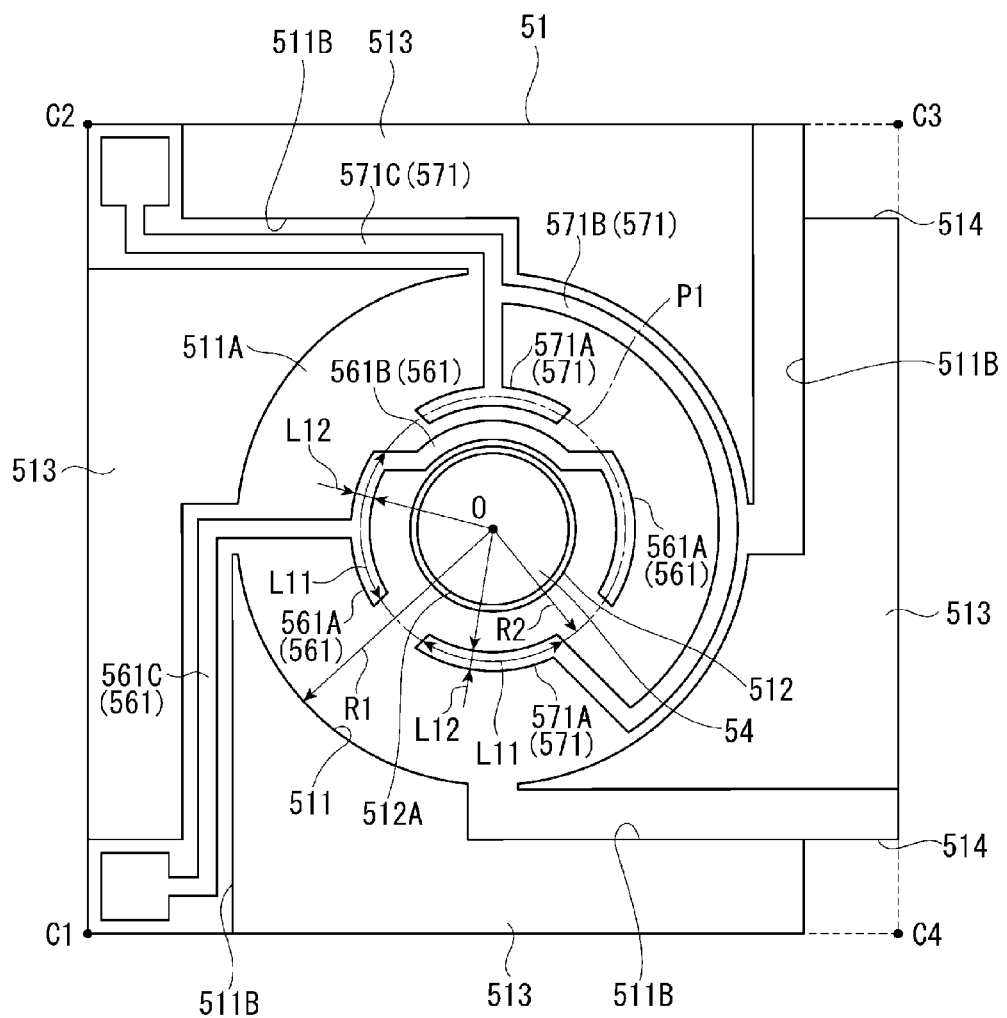
FIG. 3 is a plan view of a stationary substrate of the first embodiment viewed from a movable substrate side.
Figure 4:
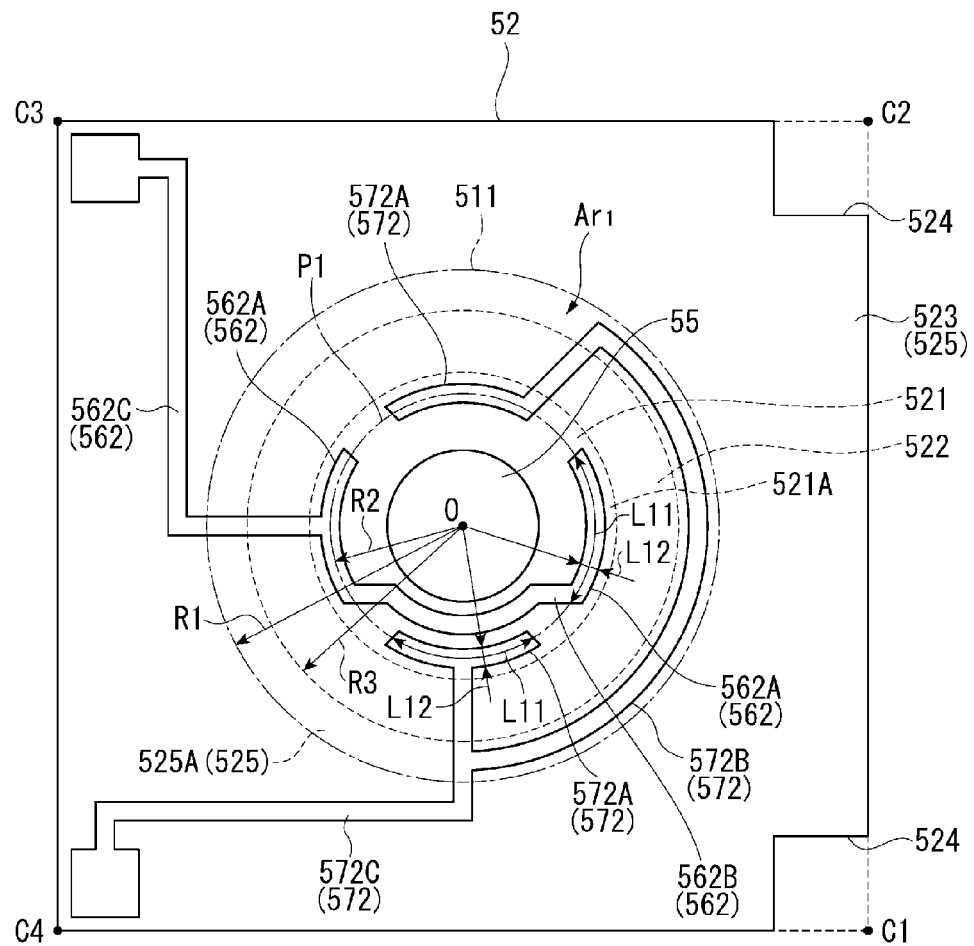
FIG. 4 is a plan view of a movable substrate of the first embodiment viewed from a stationary substrate side.
Figure 5:
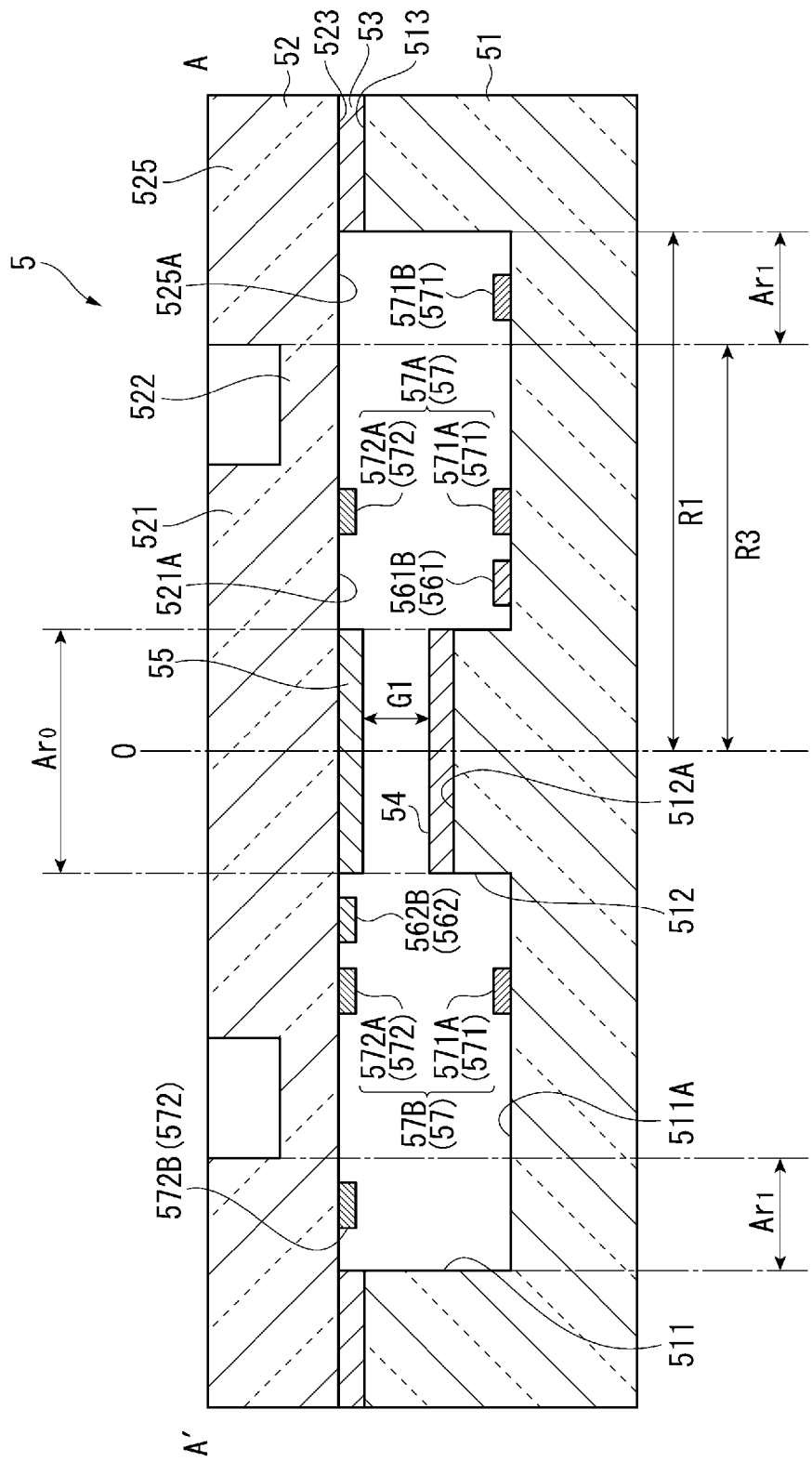
FIG. 5 is a cross-sectional view of the variable wavelength interference filter shown in FIG. 2 taken along the A-A' line.
Figure 6:
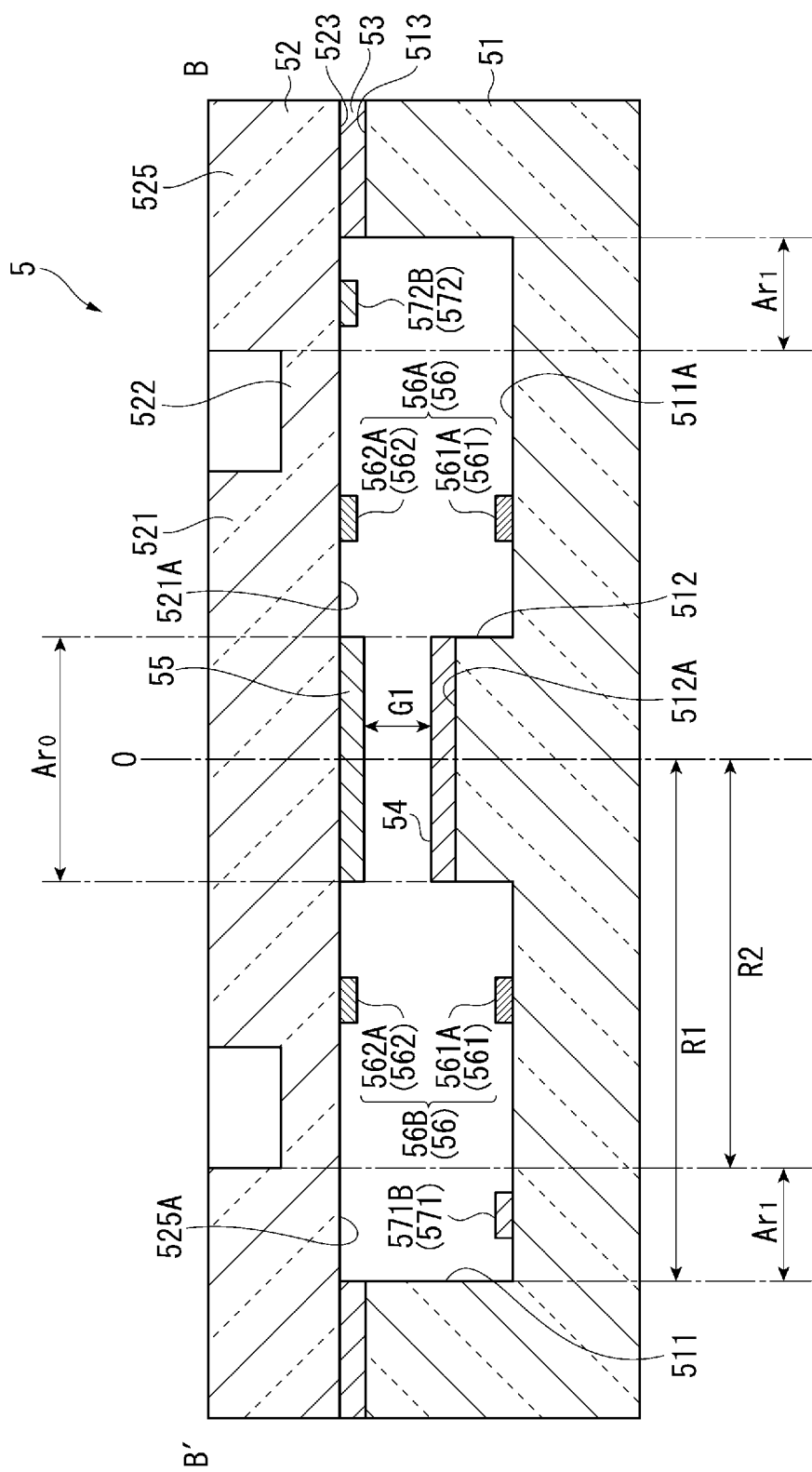
FIG. 6 is a cross-sectional view of the variable wavelength interference filter shown in FIG. 2 taken along the B-B' line.

As shown in FIG. 1, the optical module 10 is configured including a variable wavelength interference filter 5, a detector 11 (a detection section), an I-V converter 12, an amplifier 13, an A/D converter 14, and a voltage control section 15. It is also possible to adopt a configuration further provided with a light source.
Configuration of Variable Wavelength Interference Filter The variable wavelength interference filter 5 of the optical module 10 will hereinafter be explained. FIG. 2 is a plan view showing a schematic configuration of the variable wavelength interference filter 5. FIG. 3 is a plan view of the fixed substrate 51 viewed from the movable substrate 52 side. FIG. 4 is a plan view of the movable substrate 52 viewed from the fixed substrate 51 side. FIG. 5 is a cross-sectional view of the variable wavelength interference filter 5 shown in FIG. 2 taken along the A-A' line. FIG. 6 is a cross-sectional view of the variable wavelength interference filter 5 shown in FIG. 2 taken along the B-B' line.

As shown in FIG. 2, the variable wavelength interference filter 5 is an optical member having, for example, a rectangular plate shape, and is provided with a stationary substrate 51 and a movable substrate 52. The stationary substrate 51 and the movable substrate 52 can be each formed of a variety of types of glass, a quartz crystal, or the like, and are configured integrally by bonding a first bonding section 513 of the stationary substrate 51 and a second bonding section 523 of the movable substrate 52 to each other with a bonding film 53 formed of, for example, a plasma-polymerized film consisting primary of, for example, siloxane.

The stationary substrate 51 is provided with a stationary reflecting film 54 constituting the first reflecting film in this embodiment of the invention, and the movable substrate 52 is provided with a movable reflecting film 55 constituting the second reflecting film in this embodiment of the invention. The stationary reflecting film 54 and the movable reflecting film 55 are disposed so as to be opposed to each other across an inter-reflecting film gap G1. Further, in a plan view of the stationary substrate 51 and the movable substrate 52 viewed from the thickness direction thereof, the region where the stationary reflecting film 54 and the movable reflecting film 55 overlap each other constitutes an optical interference region $Ar_0$ of this embodiment of the invention.

Further, the variable wavelength interference filter 5 is provided with a first electrostatic actuator 56 (a first actuator) and a second electrostatic actuator 57 (a second actuator) used for controlling (varying) the gap amount of the inter-reflecting film gap G1. The first electrostatic actuator 56 and the second electrostatic actuator 57 are arranged to be able to be independently driven due to the control of the voltage control section 15.

It should be noted that in the explanation below, the plan view from the substrate thickness direction of the stationary substrate 51 or the movable substrate 52, namely the plan view of the variable wavelength interference filter 5 viewed from the stacking direction of the stationary substrate 51 and the movable substrate 52, is referred to as a filter plan view. Further, in the present embodiment, the center point of the stationary reflecting film 54 and the center point of the movable reflecting film 55 coincide with each other in the filter plan view, the center points of these reflecting films in the plan view are referred to as a filter center point O, and a straight line passing through these center points of the reflecting films is referred to as a center axis.
Configuration of Stationary Substrate The stationary substrate 51 is formed to have a thickness dimension larger than that of the movable substrate 52, and no distortion is caused in the stationary substrate 51 by the electrostatic attractive force due to each of the electrostatic actuators 56, 57 or the internal stress of a film member (e.g., the stationary reflecting film 54) formed on the stationary substrate 51.

As shown in FIGS. 3, 5, and 6, the stationary substrate 51 is provided with an electrode arrangement groove 511 and a reflecting film installation section 512 each formed by, for example, etching. Further, as shown in FIGS. 2 and 3, cutout sections 514 are respectively disposed at vertexes C3, C4 of the stationary substrate 51.

The electrode arrangement groove 511 is formed to have a ring-like shape with an outer radius R1 centered on the filter center point O of the stationary substrate in the filter plan view. The reflecting film installation section 512 is formed so as to protrude toward the movable substrate 52 from a core of the electrode arrangement groove 511 in the filter plan view. A bottom surface of the electrode arrangement groove 511 forms an electrode installation surface 511A on which electrodes constituting the first electrostatic actuator 56 and the second electrostatic actuator 57 are disposed. Further, a protrusion tip surface of the reflecting film installation section 512 forms a reflecting film installation surface 512A on which the stationary reflecting film 54 is disposed.

Further, the stationary substrate 51 is provided with electrode extraction grooves 511B each extending from the electrode arrangement groove 511 toward an outer peripheral edge of the stationary substrate 51. Specifically, the stationary substrate 51 is provided with four electrode extraction grooves 511B respectively extending toward the vertexes C1, C2, C3, and C4 of the stationary substrate 51.

The electrode installation surface 511A and the electrode extraction grooves 511B of the electrode arrangement groove 511 are provided with a first electrode 561 constituting the first electrostatic actuator 56, and a second electrode 571 constituting the second electrostatic actuator 57. It should be noted that in FIG. 2 in order to make the electrode configuration of each of the substrates 51, 52 easy to understand, the first electrode 561 and the second electrode 571 provided to the stationary electrode 51 is indicated by the solid lines, and a third electrode 562 and a fourth electrode 572 provided to the movable substrate 52 are indicated by the dotted lines.

The first electrode 561 is provided with two first partial electrodes 561A point-symmetrical about the filter center point O. In other words, as shown in FIG. 3, these first partial electrodes 561A each have an arc shape along an imaginary circle P1 with a radius R1 centered on the filter center point O, and are each formed so that the length dimension along the arc direction of the imaginary circle P1 is L11, and the width dimension along the radial direction of the imaginary circle P1 is L12. Further, these first partial electrodes 561A are disposed at positions with regular angular intervals (180-degree intervals) with respect to the filter center point O with equal distances from the filter center point O.

Further, the first electrode 561 is provided with a first connection electrode 561B for connecting the first partial electrodes 561A to each other. The first connection electrode 561B extends from an end of the inner edge of each of the first partial electrodes 561A, and passes inside the imaginary circle P1 and by the side C2-C3 side of the reflecting film installation section 512 to connect the two first partial electrodes 561A to each other.

Further, the first electrode 561 is provided with a first extraction electrode 561C extending from one (the first partial electrode 561A disposed on the side C1-C2 side in the present embodiment) of the two first partial electrodes 561A to the vertex C1 along the electrode extraction groove 511B. A tip portion of the first extraction electrode 561C is exposed from one of cutout sections 524 described later provided to the movable substrate 52 when viewing the variable wavelength interference filter 5 from the movable substrate 52 side. Further, the tip portion of the first extraction electrode 561C is connected to the voltage control section 15 with, for example, flexible printed circuits (FPC) or lead wires.

The second electrode 571 is provided with two second partial electrodes 571A point-symmetrical about the filter center point O. In other words, as shown in FIG. 3, these second partial electrodes 571A each have an arc shape along an imaginary circle P1 with a radius R2 centered on the filter center point O, and are each formed so that the length dimension along the arc direction of the imaginary circle P1 is L11, and the width dimension along the radial direction of the imaginary circle P1 is L12. Further, these second partial electrodes 571A are disposed at positions with regular angular intervals (180-degree intervals) with respect to the filter center point O with equal distances from the filter center point O.

It should be noted that although in the present embodiment there is illustrated a configuration example in which a straight line connecting the center points of the arcs of the first partial electrodes 561A to each other and a straight line connecting the center points of the arcs of the second partial electrodes 571A to each other intersect perpendicularly to each other, a configuration in which the straight lines intersect at a different angle with each other can also be adopted.

Further, the second electrode 571 is provided with a second connection electrode 571B for connecting the second partial electrodes 571A to each other. The second connection electrode 571B extends from an end of the outer edge of each of the second partial electrodes 571A, and passes by the outer peripheral portion of the electrode arrangement groove 511 to connect the two second partial electrodes 571A to each other. Specifically, the radius R1 of the electrode arrangement groove 511 is set to be larger than the outer radius R3 of a holding section 522 (described later) of the movable substrate 52. Therefore, a region (a immovable area $Ar_1$; see FIGS. 2, 5, and 6) with a distance from the filter center point O included in a range between R3 and R1 does not overlap the holding section 522 in the filter plan view, and the distortion of a movable section 521 of the movable substrate 52 hardly occurs even in the case in which the electrostatic attractive force is caused in the immovable area $Ar_1$ by the electrostatic actuators 56, 57.

Further, the second electrode 571 is provided with a second extraction electrode 571C extending from the second connection electrode 571B to the vertex C2 along the electrode extraction groove 511B. A tip portion of the second extraction electrode 571C is exposed from the cutout sections 524 when viewing the variable wavelength interference filter 5 from the movable substrate 52 side. Further, the tip portion of the second extraction electrode 571C is connected to the voltage control section 15 with, for example, FPC or lead wires.

Further, it is also possible to adopt the configuration in which an insulating film for ensuring an insulation property with respect to the third electrode 562 and the fourth electrode 572 is stacked on the first electrode 561 and the second electrode 571.

As described above, the reflecting film installation section 512 is formed to have a roughly columnar shape coaxial with the electrode arrangement groove 511 and to have a diameter smaller than that of the electrode arrangement groove 511, and is provided with the reflecting film installation surface 512A opposed to the movable substrate 52 of the reflecting film installation section 512.

As shown in FIGS. 3, 5, and 6, the stationary reflecting film 54 is installed in the reflecting film installation section 512.

As the stationary reflecting film 54, a metal film made of, for example, Ag, or a conductive alloy film made of, for example, an Ag alloy can be used. Further, it is also possible to use a dielectric multilayer film having the high refractive index layer made of $TiO_2$ and the low refractive index layer made of $SiO_2$, and it is also possible to use a reflecting film composed of a dielectric multilayer film and a metal film stacked on each other, a reflecting film composed of a dielectric monolayer film and an alloy film stacked on each other, and the like.

Further, it is also possible to form an antireflection film on a plane of incidence of light (the surface not provided with the stationary reflecting film 54) of the stationary substrate 51 at a position corresponding to the stationary reflecting film 54. The antireflection film can be formed by alternately stacking low refractive index films and high refractive index films, and decreases the reflectance of the visible light on the surface of the stationary substrate 51, while increasing the transmittance thereof.

Further, the surface of the stationary substrate 51, which is opposed to the movable substrate 52, and on which the electrode arrangement groove 511, the reflecting film installation section 512, and the electrode extraction grooves 511B are not formed, constitutes a first bonding section 513. The first bonding section 513 is bonded to the second bonding section 523 of the movable substrate 52 with the bonding film 53.

Configuration of Movable Substrate

The movable substrate 52 is provided with the movable section 521 having a circular shape centered on the filter center point O, a holding section 522 coaxial with the movable section 521 and for holding the movable section 521, and a substrate peripheral section 525 disposed outside the holding section 522 in the filter plan view shown in FIG. 2.

Further, as shown in FIGS. 2 and 4, the cutout sections 524 are respectively disposed at vertexes C1, C2 of the movable substrate 52.

The movable section 521 is formed to have a thickness dimension larger than that of the holding section 522, and is formed in the present embodiment, for example, to have the same thickness dimension as that of the movable substrate 52 (the substrate peripheral section 525). The movable section 521 is formed to have a diameter larger than at least the diameter of the outer peripheral edge of the reflecting film installation surface 512A in the filter plan view. Further, the movable section 521 is provided with the movable reflecting film 55, the third electrode 562 constituting the first electrostatic actuator 56, and the fourth electrode 572 constituting the second electrostatic actuator 57.

The holding section 522 is a diaphragm surrounding the periphery of the movable section 521, and is formed to have a thickness dimension smaller than that of the movable section 521. Such a holding section 522 is easier to deflect than the movable section 521, and it becomes possible to displace the movable section 521 toward the stationary substrate 51 with a weak electrostatic attractive force. On this occasion, since the movable section 521 has a larger thickness dimension and higher rigidity than those of the holding section 522, the shape variation of the movable section 521 does not occur even in the case in which the holding section 522 is pulled toward the stationary substrate 51 due to the electrostatic attractive force. Therefore, deflection of the movable reflecting film 55 provided to the movable section 521 does not occur, and it becomes possible to always keep the stationary reflecting film 54 and the movable reflecting film 55 in a parallel state.

It should be noted that although in the present embodiment the holding section 522 having a diaphragm shape is shown as an example, the shape is not limited thereto, but a configuration of, for example, providing beam-like holding sections arranged at regular angular intervals centered on the filter center point O can also be adopted.

As described above, the substrate peripheral section 525 is disposed outside the holding section 522 in the filter plan view.

Further, in the present embodiment, the holding section 522 is formed to have the radius R3 of the outer edge smaller than the radius R1 of the electrode arrangement groove 511. Therefore, the substrate peripheral section 525 has the second bonding section 523 (a bond region) opposed to the first bonding section 513 and connected to the stationary substrate 51 via the bonding film 53, and a non-bonding section 525A (a non-bond region) opposed to the electrode arrangement groove 511.

Further, in the filter plan view, the region overlapping the non-bonding section 525A forms the immovable area $Ar_1$, and in the immovable area $Ar_1$, the deflection of the movable section 521 of the movable substrate 52 hardly occurs even in the case in which the electrostatic attractive force is generated by the electrostatic actuators 56, 57 as described above. Further, since the immovable area $Ar_1$ is formed to have a thickness dimension larger than that of the holding section 522, even if a film such as an electrode is formed in the immovable area $Ar_1$ of the substrate peripheral section 525, the deflection due to the film stress can be suppressed.

It should be noted that it is also possible to form an antireflection film on the opposite surface of the movable section 521 to the stationary substrate 51 similarly to the case of the stationary substrate 51.

The third electrode 562 is provided with two third partial electrodes 562A point-symmetrical about the filter center point O. As shown in FIG. 4, these third partial electrodes 562A each have an arc shape along an imaginary circle P1 with the radius R1 centered on the filter center point O, and are each formed so that the length dimension along the arc direction of the imaginary circle P1 is L11, and the width dimension along the radial direction of the imaginary circle P1 is L12. Further, these third partial electrodes 562A are disposed at positions overlapping the first partial electrodes 561A, respectively, in the filter plan view as shown in FIG. 2.

Further, the third electrode 562 is provided with a third connection electrode 562B for connecting the third partial electrodes 562A to each other. The third connection electrode 562B extends from an end of the inner edge of each of the third partial electrodes 562A, and passes inside the imaginary circle P1 and by the side C1-C4 side of the movable reflecting film 55 to connect the two third partial electrodes 562A to each other.

Further, the third electrode 562 is provided with a third extraction electrode 562C extending from one (the third partial electrode 562A disposed on the side C1-C4 side in the present embodiment) of the two third partial electrodes 562A to the vertex C3. A tip portion of the third extraction electrode 562C is exposed from one of the cutout sections 514 provided to the stationary substrate 51 when viewing the variable wavelength interference filter 5 from the stationary substrate 51 side. Further, the tip portion of the third extraction electrode 562C is connected to the voltage control section 15 with, for example, FPC or lead wires.

The fourth electrode 572 is provided with two fourth partial electrodes 572A point-symmetrical about the filter center point O. In other words, as shown in FIG. 4, these fourth partial electrodes 572A each have an arc shape along the imaginary circle P1, and are each formed so that the length dimension along the arc direction of the imaginary circle P1 is L11, and the width dimension along the radial direction of the imaginary circle P1 is L12. Further, these fourth partial electrodes 572A are disposed at positions overlapping the second partial electrodes 571A, respectively, in the filter plan view as shown in FIG. 2.

Further, the fourth electrode 572 is provided with a fourth connection electrode 572B for connecting the fourth partial electrodes 572A to each other. The fourth connection electrode 572B extends from an end of the outer edge of each of the fourth partial electrodes 572A, and passes by the immovable area $Ar_1$ of the substrate peripheral section 525 to connect the two fourth partial electrodes 572A to each other.

Further, the fourth electrode 572 is provided with a fourth extraction electrode 572C extending from the fourth connection electrode 572B to the vertex C4. A tip portion of the fourth extraction electrode 572C is exposed from the cutout sections 514 when viewing the variable wavelength interference filter 5 from the stationary substrate 51 side. Further, the tip portion of the fourth extraction electrode 572C is connected to the voltage control section 15 with, for example, FPC or lead wires.

Here, as shown in FIG. 2, in the present embodiment, there is adopted the configuration in which a part of the fourth connection electrode 572B and a part of the first extraction electrode 561C overlap each other, and a part of the second connection electrode 571B and a part of the third extraction electrode 562C overlap each other in the immovable area $Ar_1$ in the filter plan view. However, as described above, in the immovable area $Ar_1$, the displacement of the movable section 521 is extremely small and negligible even if the electrostatic attractive force is generated due to the overlap between the electrodes.

As shown in FIGS. 2 and 6, in the present embodiment, the region (the area indicated by the upward sloping line section in FIG. 2) where the first partial electrode 561A and the third partial electrode 562A disposed on the side C1-C2 side overlap each other constitutes one first partial actuator 56A, the region where the first partial electrode 561A and the third partial electrode 562A disposed on the side C3-C4 side overlap each other constitutes another first partial actuator 56B, and these two partial actuators 56A, 56B constitute the first electrostatic actuator 56.

Further, these two partial actuators 56A, 56B have the same shape, and are disposed at positions with regular angular intervals (180-degree intervals) with respect to the filter center point O with equal distances from the filter center point O. Further, the first partial electrodes 561A are connected to each other by the first connection electrode 561B so as to have the same electrical potential, and the third partial electrodes 562A are connected to each other by the third connection electrode 562B so as to have the same electrical potential. Therefore, when a voltage is applied between the first extraction electrode 561C and the third extraction electrode 562C, the electrostatic attractive forces having the same level are generated in the respective partial actuators 56A, 56B.

Thus, since the first electrostatic actuator 56 can generate the same electrostatic attractive forces in the regions point-symmetrical about the filter center point O, it becomes possible to displace the movable section 521 toward the stationary substrate 51 in a balanced manner while suppressing the tilt of the movable section 521.

As shown in FIGS. 2 and 5, in the present embodiment, the region (the area indicated by the downward sloping line section in FIG. 2) where the second partial electrode 571A and the fourth partial electrode 572A disposed on the side C2-C3 side overlap each other constitutes one second partial actuator 57A, the region where the second partial electrode 571A and the fourth partial electrode 572A disposed on the side C1-C4 side overlap each other constitutes another second partial actuator 57B, and these two partial actuators 57A, 57B constitute the second electrostatic actuator 57.

Further, these two partial actuators 57A, 57B have the same shape, and are disposed at positions with regular angular intervals (180-degree intervals) with respect to the filter center point O with equal distances from the filter center point O. Further, the second partial electrodes 571A are connected to each other by the second connection electrode 571B so as to have the same electrical potential, and the fourth partial electrodes 572A are connected to each other by the fourth connection electrode 572B so as to have the same electrical potential. Therefore, when a voltage is applied between the second extraction electrode 571C and the fourth extraction electrode 572C, the electrostatic attractive forces having the same level are generated in the respective partial actuators 57A, 57B.

Thus, since the second electrostatic actuator 57 can generate the same electrostatic attractive forces in the regions point-symmetrical about the filter center point O, it becomes possible to displace the movable section 521 toward the stationary substrate 51 in a balanced manner while suppressing the tilt of the movable section 521 similarly to the first electrostatic actuator 56.

The movable reflecting film 55 is disposed at the central portion of a movable surface 521A of the movable section 521 so as to be opposed to the stationary reflecting film 54 across the inter-reflecting film gap G1. As the movable reflecting film 55, a reflecting film having the same configuration as that of the stationary reflecting film 54 described above is preferably used.

It should be noted that although the example in which the gaps between the electrodes are larger than the inter-reflecting film gap G1 is described in the present embodiment, the invention is not limited thereto. It is also possible to adopt the configuration in which the inter-reflecting film gap G1 is larger than the gaps between the electrodes depending on the wavelength band of the measurement target light in the case of using, for example, an infrared beam or a far infrared beam as the measurement target light.

Configuration of Detector, I-V Converter, Amplifier, and A/D Converter of Optical Module The detector 11 receives the light transmitted through the variable wavelength interference filter 5, and then outputs a detection signal corresponding to the received light intensity to the I-V converter 12.

The I-V converter 12 converts the detection signal input from the detector 11 into a voltage value, and then outputs it to the amplifier 13.

The amplifier 13 amplifies a voltage (a detection voltage), which corresponds to the detection signal, and is input from the I-V converter 12.

The A/D converter 14 converts the detection voltage (an analog signal) input from the amplifier 13 into a digital signal, and then outputs it to the control section 20.

It should be noted that it is also possible to adopt a configuration equipped with a light source in addition thereto.

Configuration of Voltage Control Section

The voltage control section 15 drives each of the electrostatic actuators 56, 57 of the variable wavelength interference filter 5 by applying the drive voltages based on the control by the control section 20 to thereby transmit the light with the predetermined target wavelength through the variable wavelength interference filter 5.

Specifically, the voltage control section 15 has a storage section (not shown) formed of a memory or the like, and controls the voltage applied to the variable wavelength interference filter 5 based on the voltage table data stored in the storage section. It should be noted that although the example of storing the voltage table data in the storage section provided to the optical module 10 is described in the present embodiment, it is also possible to store the voltage table data in a storage section (not shown) provided to, for example, the control section 20.

FIG. 7 is a diagram showing an example of the voltage table data corresponding to the target wavelength λ8 in the voltage control section 15 in the present embodiment.

The voltage table data is for varying the gap amount of the inter-reflecting film gap G1 in N levels in total by sequentially applying the voltages to each of the first electrostatic actuator 56 and the second electrostatic actuator 57, and FIG. 7 shows an example with N=9. It should be noted that in FIG. 7 the state (the state with no voltage applied) in which the voltage to be applied to both of the first electrostatic actuator 56 and the second electrostatic actuator 57 is "0" is not included in the N level gap variation range. It should be noted that the state in which no voltage is applied to both of the first electrostatic actuator 56 and the second electrostatic actuator 57 can also be defined as a state with the maximum transmission peak wavelength.

Method of Driving Variable Wavelength Interference Filter with Voltage Control Section The voltage control section 15 reads the voltage table data corresponding to the target wavelength set by the control section 20, and then sequentially applies the voltages to the first electrostatic actuator 56 and the second electrostatic actuator 57 based on the voltage table data thus read.

Figure 8:
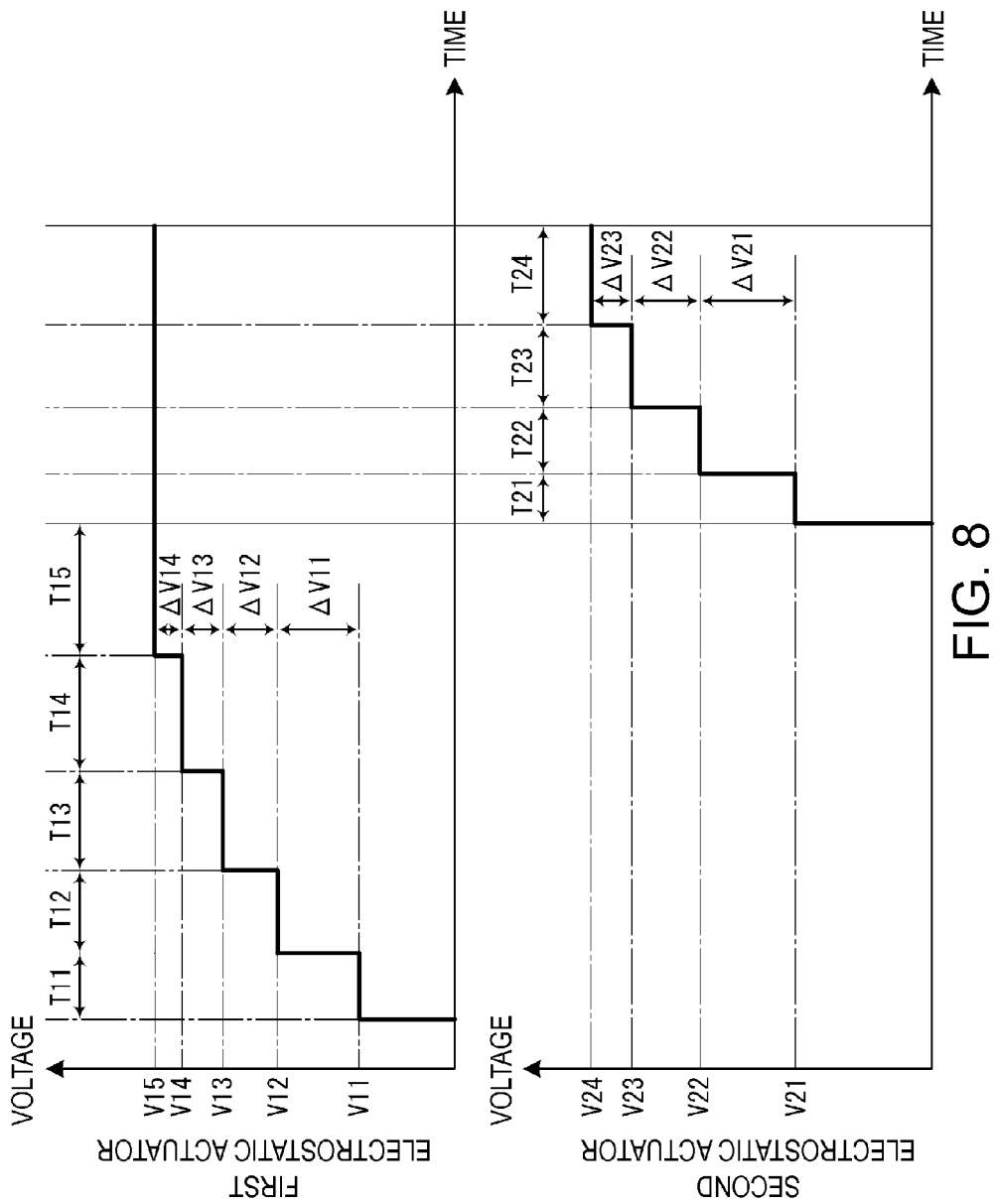
FIG. 8 is a timing chart of voltage application realized by performing the drive in the order of the data number of the voltage table data shown in FIG. 7.

FIG. 8 is a timing chart of the voltage application realized by performing the drive in the order of the data number of the voltage table data shown in FIG. 7.

In the present embodiment, as shown in FIGS. 7 and 8, the voltage control section 15 applies the L (=5) levels of voltages (V11 through V15, V11<V12<V13<V14<V15 (first voltages)) to the first electrostatic actuator 56, and applies the M (=4) levels of voltages (V21 through V24, V21<V22<V23<V24 (second voltages)) to the second electrostatic actuator 57. Thus, the voltage control section 15 varies the gap amount of the inter-reflecting film gap G1 in N (=L+M=9) levels from g0 to g8 to transmit the light with the target wavelength λ8 through the variable wavelength interference filter 5.

Here, the values of the division numbers (L, M, and N) of the applied voltage can arbitrarily be changed, and are preferably set to the integers satisfying L≥3, M≥3, and N≥6. By setting them so as to satisfy L≥3, M≥3, and N≥6, it is possible to finely divide the applied voltage and sequentially apply the voltages thus divided to each of the first electrostatic actuator 56 and the second electrostatic actuator 57.

By dividing the applied voltage and sequentially applying the voltages thus divided to the two electrostatic actuators 56, 57 of the variable wavelength interference filter 5 as described above, it becomes possible to control the gap amount of the inter-reflecting film gap G1 with high accuracy.

Specifically, in the case of dividing the target voltage into N levels and then sequentially increasing the applied voltage in the existing configuration of driving the variable wavelength interference filter only with one electrostatic actuator, it is assumed that the minimum value of the voltage variation between the different applied voltage values is $\Delta V_{0min}$. In contrast, in the present embodiment, since the variable wavelength interference filter 5 is driven with the two electrostatic actuators 56, 57, the target voltage can be sufficiently divided into N/2 levels and then assigned to each of the electrostatic actuators 56, 57. Therefore, assuming that the minimum values of the voltage variations between the different voltages applied to the electrostatic actuators 56, 57 are $\Delta V_{1min}$, $\Delta V_{2min}$, respectively, $\Delta V_{0min} < \Delta V^{1min}$, and $\Delta V_{0min} < \Delta V_{2min}$ are obviously true. As described above, by assuring the minimum voltage variations $\Delta V_{1min}$, $\Delta V_{2min}$ to be large, the gap fluctuation can be reduced even if the applied voltage to the first electrostatic actuator 56 or the second electrostatic actuator 57 varies in a certain extent due to the noise depending on the power fluctuation, the environment, and the like. In other words, the sensitivity to the noise becomes low, or the voltage sensitivity becomes lower. Thus, in the present embodiment, the accurate gap control becomes possible compared to the case of applying the target voltage to a single electrostatic actuator.

Here, the values of the division numbers (L, M, and N) of the applied voltage can arbitrarily be changed, and are preferably set to the integers satisfying L≥3, M≥3, and N≥6. By setting them so as to satisfy L≥3, M≥3, and N≥6, it is possible to finely divide the applied voltage and sequentially apply the voltages thus divided to each of the first electrostatic actuator 56 and the second electrostatic actuator 57.

Next, the method of driving the first electrostatic actuator 56 and the second electrostatic actuator 57 with the voltage control section 15 will be explained in detail.

As shown in FIG. 7, the voltage control section firstly applies the voltages V11 through V15 sequentially to the first electrostatic actuator 56. Thus, it is possible to sequentially increase the voltage applied to the first electrostatic actuator 56, and the gap amount of the inter-reflecting film gap G1 is sequentially narrowed to g0, g1, g2, g3, and g4. As a result, the wavelength of the light transmitted through the variable wavelength interference filter 5, namely the transmission peak wavelength, sequentially varies so as to decrease to λ0, λ1, λ2, λ3, and λ4.

Then, as shown in FIG. 7, the voltage control section 15 sequentially applies the voltage V21 through V24 to the second electrostatic actuator 57 while keeping the application of the maximum applied voltage V15 to the first electrostatic actuator 56. Thus, it is possible to sequentially increase the voltage applied to the second electrostatic actuator 57, and the gap amount of the inter-reflecting film gap G1 sequentially decreases to g5, g6, g7, and g8. As a result, the wavelength of the light transmitted through the variable wavelength interference filter 5, namely the transmission peak wavelength, sequentially varies so as to decrease to λ5, λ6, λ7, and λ8.

As described above, the voltage control section 15 sequentially increases the voltage to be applied to the first electrostatic actuator 56, and then set the voltage to the target voltage (the first voltage) V15. Subsequently, the voltage control section 15 sequentially increases the voltage to be applied to the second electrostatic actuator 57 and then set the voltage to the target voltage (the second voltage) V24 while keeping the applied voltage to the first electrostatic actuator 57 in the voltage V15.

As described above, by gradually raising the voltages to be applied to the first electrostatic actuator 56 and the second electrostatic actuator 57 to thereby approximate the voltages to the target voltages, the vibration amplitude of the movable section 521 upon application of each of the voltages can be reduced. Thus, the damped free vibration of the movable section 521 can be suppressed, and the prompt wavelength varying operation can be performed.

Variation of Applied Voltage to Each of Electrostatic Actuators

As described above, the voltage control section 15 gradually raises the voltages respectively applied to the first electrostatic actuator 56 and the second electrostatic actuator 57, and then sets the voltages to the target voltages. Here, in the present embodiment, when switching the voltage to be applied to the first electrostatic actuator 56, the voltage variation is gradually decreased as shown in FIG. 8.

Similarly, when switching the voltage to be applied to the second electrostatic actuator 57, the voltage control section 15 gradually decreases the voltage variation.

The reason of setting such a relationship as described above is as follows.

The electrostatic attractive force F generated when applying the voltages respectively to the first electrostatic actuator 56 and the second electrostatic actuator 57 can be expressed as "$F = (1/2) \in (V/G)^2 S$." Here, $\in$ denotes the dielectric constant, V denotes the applied voltage, G denotes the amount of the gap between the electrodes, and S denotes the opposed electrode area. According to this formula, the electrostatic attractive force F is proportional to the square of the voltage applied to each of the first electrostatic actuator 56 and the second electrostatic actuator 57, and is inversely proportional to the amount of the gap between the electrodes. Therefore, if the voltage variation is constant when switching the voltage to be applied to each of the first electrostatic actuator 56 and the second electrostatic actuator 57, it results that the increment $\Delta F$ in the electrostatic attractive force rapidly increases as the amount of the gap between the electrodes decreases, which causes an overshoot.

Therefore, in the present embodiment, the voltage control section 15 decreases the voltage variation while raising the voltage. Thus, it is possible to suppress the rapid increase in the electrostatic attractive force when the gap is narrowed to thereby further suppress the overshoot, and thus, the prompter wavelength varying operation can be realized.

Application Period of Voltage to Each of Electrostatic Actuator

As shown in FIG. 8, the voltage control section 15 gradually increases the application period of the voltage when switching the applied voltage to each of the first electrostatic actuator and the second electrostatic actuator 57. For example, the period T12 for applying the voltage V12 to the first electrostatic actuator 56 is set to be longer than the period T11 for applying the voltage V11, and the period T13 for applying the voltage V13 is set to be longer than the period T12 for applying the voltage V12. The same applies to the second electrostatic actuator 57, and the period T22 for applying the voltage V22 is set to be longer than the period T21 for applying the voltage V21, and the period T23 for applying the voltage V23 is set to be longer than the period T22 for applying the voltage V22.

In general, when switching the voltage applied to the first electrostatic actuator 56 and the second electrostatic actuator 57 to a higher voltage, the restoring force due to the holding section 522 also increases, and the time until the movable section 521 is settled is elongated. In contrast, in the present embodiment, since the period of applying the voltage is set to be longer when switching the voltage to a higher voltage as described above, it is possible to more promptly settle the inter-reflecting film gap G1 in a predetermined value.

Configuration of Control Section

Going back to FIG. 1, the control section 20 of the spectroscopic measurement device 1 will be explained.

The control section 20 corresponds to a processing section of this embodiment of the invention, and is configured by combining, for example, a CPU and a memory with each other, and controls an overall operation of the spectroscopic measurement device 1. As shown in FIG. 1, the control section 20 is provided with a wavelength setting section 21, a light intensity acquisition section 22, and a spectroscopic measurement section 23.

The wavelength setting section 21 sets the target wavelength of the light to be taken out by the variable wavelength interference filter 5, and then outputs a control signal instructing that the light with the target wavelength thus set be taken out from the variable wavelength interference filter 5 to the voltage control section 15.

The light intensity acquisition section 22 obtains the light intensity of the light with the target wavelength transmitted through the variable wavelength interference filter 5 based on the light intensity obtained by the detector 11.

The spectroscopic measurement section 23 measures the spectrum characteristics of the measurement target light based on the light intensity obtained by the light intensity acquisition section 22.

Functions and Advantages of First Embodiment

In the present embodiment, the first electrostatic actuator 56 and the second electrostatic actuator 57, which can be driven independently from each other, are disposed outside the optical interference region $Ar_0$.

In such a configuration, it is possible to apply the respective voltages different from each other as shown in FIG. 7 can be applied to the first electrostatic actuator 56 and the second electrostatic actuator 57 by the voltage control section 15. Thus, the influence of the noise depending on the power fluctuation and the environment can be suppressed, and the control of the inter-reflecting film gap G1 can be accurately performed.

Further, the first partial actuators 56A, 56B constituting the first electrostatic actuator 56 are arranged point-symmetrically about the filter center point O. Similarly, the second partial actuators 57A, 57B constituting the second electrostatic actuator 57 are arranged point-symmetrically about the filter center point O. In other words, the first partial actuators 56A, 56B have the same shape, and are disposed at positions with regular angular intervals about the filter center point O, which is the center point of the optical interference region $Ar_0$, with equal distances from the filter center point O. Further, the second partial actuators 57A, 57B have the same shape, and are disposed at positions with regular angular intervals about the filter center point O, which is the center point of the optical interference region $Ar_0$, with equal distances from the filter center point O.

Therefore, when applying a voltage to the first electrostatic actuator 56, the same electrostatic attractive forces act on the two first partial actuators 56A, 56B at the positions point-symmetrical with each other. Further, when applying a voltage to the second electrostatic actuator 57, the same electrostatic attractive forces act on the two second partial actuators 57A, 57B at the positions point-symmetrical with each other. Therefore, it is possible to deflect the holding section 522 in a balanced manner when driving the first electrostatic actuator 56 and the second electrostatic actuator 57 with the voltage control section 15, and thus, it is possible to displace the movable section 521 toward the stationary substrate 51 in the state of keeping the parallelism between the stationary reflecting film 54 and the movable reflecting film 55. Thus, it is possible to perform accurate gap control of the inter-reflecting film gap G1.

In the present embodiment, the first electrostatic actuator 56 (the first partial actuators 56A, 56B) and the second electrostatic actuator 57 (the second partial actuators 57A, 57B) are disposed along the circumference of the imaginary circle P1 centered on the center point O of the optical interference region $Ar_0$. Therefore, it is possible to reduce the area where the electrodes are formed to thereby promote miniaturization of the variable wavelength interference filter 5 compared to the configuration in which, for example, either one of the first electrostatic actuator 56 and the second electrostatic actuator 57 is disposed outside the other, namely the configuration in which the radial dimension of the first electrostatic actuator 56 and the radial dimension of the second electrostatic actuator 57 are different from each other.

In the present embodiment, the first electrode 561 is provided with the two first partial electrodes 561A, the first connection electrode 561B for connecting these first partial electrodes 561A to each other, and the first extraction electrode 561C to be connected to one of the first partial electrodes 561A. Therefore, by applying a voltage between the first extraction electrode 561C and the third extraction electrode 562C, the electrical potentials of the two first partial electrodes 561A can be set to the same electrical potential. Therefore, the simplification of the electrode configuration can be achieved compared to the configuration of, for example, providing the extraction electrodes respectively to the first partial electrodes 561A, and as a result, miniaturization of the variable wavelength interference filter 5 can be achieved.

Similarly, the second electrode 571 is provided with the two second partial electrodes 571A, the second connection electrode 571B for connecting these second partial electrodes 571A to each other, and the single second extraction electrode 571C. Therefore, simplification of the electrode configuration of the second electrode 571 can be achieved, and thus, miniaturization of the variable wavelength interference filter 5 can be achieved.

In the present embodiment, the movable substrate 52 has the movable section 521, the holding section 522, and the substrate peripheral section 525. Further, the substrate peripheral section 525 is provided with the second bonding section 523 to be bonded to the first bonding section 513 of the stationary substrate 51 via the bonding film 53, and the non-bonding section 525A, which is not bonded to the stationary substrate 51 but is opposed to the electrode arrangement groove 511 with a gap. Further, the second connection electrode 571B constituting the second electrode 571 and the fourth connection electrode 572B are disposed in the immovable area $Ar_1$ overlapping non-bonding section 525A in the filter plan view, and partially overlap each other in the immovable area $Ar_1$.

Here, the non-bonding section 525A is formed to have a larger thickness dimension compared to the holding section 522. Therefore, even in the case in which the electrostatic attractive force acts in the immovable area $Ar_1$, the deflection of the non-bonding section 525A is extremely small and negligible. Therefore, the tilt of the movable section 521 upon application of the voltage can better be suppressed compared to the configuration in which the electrodes 561, 571 provided to the stationary substrate 51 and the electrodes 562, 572 provided to the movable substrate 52 overlap each other in the area corresponding to the movable section 521 or the holding section 522 in the filter plan view, and at the same time, the overlap area has an asymmetrical shape about the filter center point O.

In the present embodiment, the first extraction electrode 561C, the second extraction electrode 571C, the third extraction electrode 562C, and the fourth extraction electrode 572C are disposed at positions not overlapping each other in the filter plan view. Therefore, the problem that the electrostatic attractive force acts on the movable section 521 and the holding section 522 at asymmetrical positions due to the overlap between the extraction electrodes 561C, 571C, 562C, and 572C can be avoided.

In the present embodiment, the voltage control section 15 applies the target voltage (the first voltage) V15 to the first electrostatic actuator 56, and then applies the target voltage (the second voltage) V24 to the second electrostatic actuator 57. Thus, the vibration amplitude of the movable section 521 upon application of the voltage can be reduced to thereby more promptly converge the vibration compared to the case of, for example, applying the target voltages simultaneously to the first electrostatic actuator 56 and the second electrostatic actuator 57. Thus, the light with the target wavelength can be promptly taken out from the variable wavelength interference filter 5.

Further, by controlling the gap amount of the inter-reflecting film gap G1 with the two electrostatic actuators 56, 57 as described above, the voltage sensitivity can be reduced compared to the case of, for example, controlling the gap amount of the inter-reflecting film gap G1 using a single electrostatic actuator. Therefore, the influence of the noise depending on the power fluctuation and the environment can be suppressed, and the accurate gap control of the inter-reflecting film gap G1 can be performed.

In the present embodiment, the voltage control section 15 applies the second voltage V24 to the second electrostatic actuator 57 while keeping the application of the target voltage (the first voltage) V15 to the first electrostatic actuator 56.

Thus, the value of the voltage to be applied to the second electrostatic actuator 57 can be reduced compared to the case of, for example, setting the voltage to the second electrostatic actuator 57 to the second voltage after setting the voltage to the first electrostatic actuator 56 to "0." Thus, the vibration of the movable section 521 generated when driving the second electrostatic actuator 57 can be reduced to thereby more promptly take out the light with the target wavelength.

In the present embodiment, the voltage control section 15 switches the applied voltage to the first electrostatic actuator 56 in multiple stages, and gradually increases the applied voltage to the first electrostatic actuator 56 every time the voltage is switched, and finally sets the applied voltage to the target voltage (the first voltage) V15. Similarly, the voltage control section 15 switches the applied voltage to the second electrostatic actuator 57 in multiple stages, and gradually increases the applied voltage to the second electrostatic actuator 57 every time the voltage is switched, and finally sets the applied voltage to the target voltage (the second voltage) V24.

According to such a drive method, the variation of the vibration amplitude of the movable section 521 upon switching the voltages to the first electrostatic actuator 56 and the second electrostatic actuator 57 can be reduced, and thus, the vibration of the movable section 521 can be more promptly converged. Therefore, the light with the target wavelength can be more promptly taken out.

In the present embodiment, every time the voltage control section 15 switches the applied voltages to the first and second electrostatic actuators 56, 57, the voltage control section 15 sets the application period of the voltage after switching to be longer than the application period of the voltage before switching. Thus, even in the case in which a higher voltage is applied to thereby apply a stronger restoring force to the holding section 522, since the application period of the voltage is set to be longer, the vibration of the movable section 521 can be sufficiently attenuated before the timing at which the voltage is subsequently switched. Therefore, the vibration of the movable section 521 generated when the voltage is subsequently switched can be reduced, and thus, prompter convergence of the vibration of the movable section 521 can be achieved.

In the present embodiment, the voltage control section 15 decreases the voltage variation every time the applied voltages to the first and second electrostatic actuators 56, 57 are switched. Thus, in the case in which the gap amount of the inter-reflecting film gap G1 is small, the voltage variation to the first and second electrostatic actuators 56, 57 can be reduced, and thus the rapid increase in the electrostatic attractive force can be prevented, and the contact between the reflecting films 54, 55 and the increase in the vibration amplitude can be prevented.

Second Embodiment

Next, a variable wavelength interference filter according to a second embodiment of the invention will be explained.

In the first embodiment described above, there is described the example in which the region where the first partial electrodes 561A and the third partial electrodes 562A are opposed to each other in the filter plan view constitutes the first electrostatic actuator 56 (the first partial actuators 56A, 56B), and the region where the second partial electrodes 571A and the fourth partial electrodes 572A are opposed to each other constitutes the second electrostatic actuator 57 (the second partial actuators 57A, 57B).

In contrast, the second embodiment is different from the first embodiment in the point that the first electrostatic actuator 56 is constituted by a region where the first partial electrodes 561A and the third partial electrodes 562A are opposed to each other and a region where a part of the first connection electrode 561B and a part of the third connection electrode 562B are opposed to each other, and the second electrostatic actuator 57 is constituted by a region where the second partial electrodes 571A and the fourth partial electrodes 572A are opposed to each other and a region where a part of the second connection electrode 571B and a part of the fourth connection electrode 572B are opposed to each other.

Figure 9:
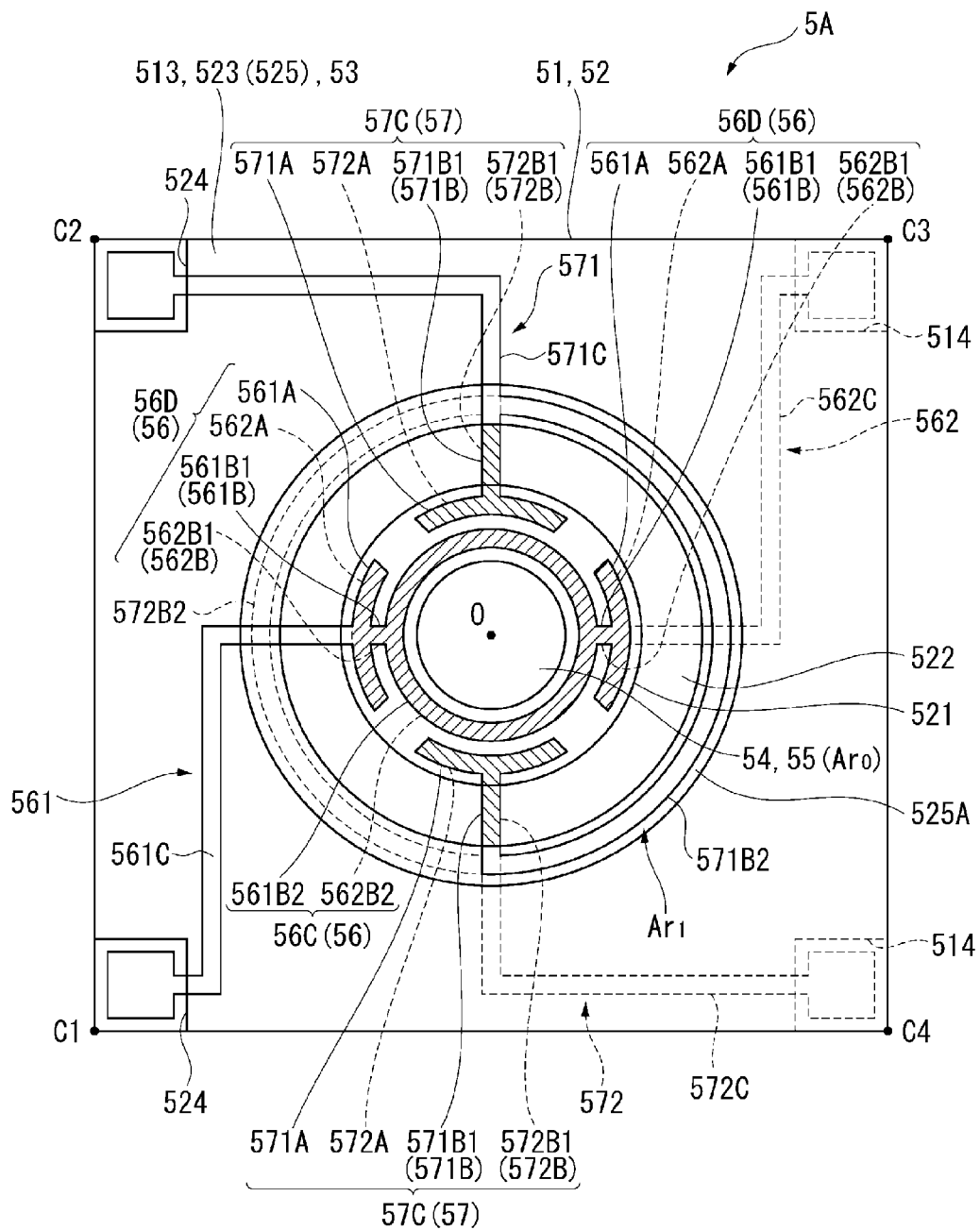
FIG. 9 is a plan view showing a variable wavelength interference filter according to a second embodiment.

FIG. 9 is a plan view showing a variable wavelength interference filter 5A according to the second embodiment. It should be noted that in the explanation of the following embodiments, the same constituents will be denoted with the same reference symbols, and the explanation therefor will be omitted.

As shown in FIG. 9, the variable wavelength interference filter 5A according to the second embodiment is provided with the first electrode 561 and the second electrode 571 disposed on the stationary substrate 51, and the third electrode 562 and the fourth electrode 572 disposed on the movable substrate 52.

Similarly to the first embodiment, the first electrode 561 is provided with the first partial electrodes 561A disposed point-symmetrically with each other centered on the filter center point O, the first connection electrode 561B for connecting the first partial electrodes 561A to each other, and the first extraction electrode 561C extending from the first partial electrode 561A on the side C1-C2 side toward the vertex C1.

Further, the third electrode 562 is provided with the third partial electrodes 562A having the same shapes as those of the first partial electrodes 561A, and overlapping the first partial electrodes 561A in the filter plan view, the third connection electrode 562B for connecting the third partial electrodes 562A to each other, and the third extraction electrode 562C extending from the third partial electrode 562A on the side C3-C4 side toward the vertex C3.

Here, as shown in FIG. 9, the first connection electrode 561B of the present embodiment is provided with first extending sections 561B1 each extending from the center of the inside arc of the first partial electrode 561A toward the filter center point O, and a first annular section 561B2 disposed inside the first partial electrodes 561A and outside the reflecting film installation section 512. Further, the third connection electrode 562B is similarly provided with third extending sections 562B1 each extending from the center of the inside arc of the third partial electrode 562A toward the filter center point O, and a third annular section 562B2 disposed inside the third partial electrodes 562A and outside the movable reflecting film 55.

In such a configuration, the first electrostatic actuator 56 is provided with first partial actuators 56D each formed of an area composed of the first partial electrode 561A and the first extending section 561B1 and an area composed of the third partial electrode 562A and the third extending section 562B1 overlapping each other, and an annular actuator 56C formed of an annular opposed area where the first annular section 561B2 and the third annular section 562B2 overlap each other. The first partial actuators 56D are formed to have the same shape, and are disposed at positions with regular angular intervals (180-degree intervals) with respect to the filter center point O and with equal distances from the filter center point O. Further, the annular actuator 56C has a symmetrical shape about the filter center point O.

Therefore, the first electrostatic actuator 56 of the present embodiment has a symmetrical shape about the filter center point O, and it becomes possible to displace the movable section 521 in the state of keeping the parallelism between the stationary reflecting film 54 and the movable reflecting film 55 in the case in which the electrostatic attractive force is generated due to application of the voltage.

Similarly to the first embodiment, the second electrode 571 is provided with the second partial electrodes 571A disposed point-symmetrically with each other centered on the filter center point O, the second connection electrode 571B for connecting the second partial electrodes 571A to each other, and the second extraction electrode 571C extending from the second connection electrode 571B toward the vertex C2. Further, the fourth electrode 572 is provided with the fourth partial electrodes 572A having the same shapes as those of the second partial electrodes 571A, and overlapping the second partial electrodes 571A in the filter plan view, the fourth connection electrode 572B for connecting the fourth partial electrodes 572A to each other, and the fourth extraction electrode 572C extending from the fourth connection electrode 572B toward the vertex C4.

Here, as shown in FIG. 9, the second connection electrode 571B of the present embodiment is provided with second extending sections 571B1 each extending from the center of the outer arc of the second partial electrode 571A outward in the radial direction, and a second arc section 571B2 disposed in the immovable area $Ar_1$.

Further, the fourth connection electrode 572B is similarly provided with fourth extending sections 572B1 each extending from the center of the outer arc of the fourth partial electrode 572A outward in the radial direction, and a fourth arc section 572B2 disposed in the immovable area $Ar_1$.

In such a configuration, the second electrostatic actuator 57 is provided with two second partial actuators 57C each formed of a region where an area composed of the second partial electrode 571A and the second extending section 571B1 and an area composed of the fourth partial electrode 572A and the fourth extending section 572B1 overlap each other. The second partial electrodes 57C are formed to have the same shape, and are disposed at positions with regular angular intervals (180-degree intervals) with respect to the filter center point O and with equal distances from the filter center point O. Therefore, the second electrostatic actuator 57 of the present embodiment has a symmetrical shape about the filter center point O, and it becomes possible to displace the movable section 521 in the state of keeping the parallelism between the stationary reflecting film 54 and the movable reflecting film 55 in the case in which the electrostatic attractive force is generated due to application of the voltage.

It should be noted that although the second extending sections 571B1 and the fourth extending sections 572B1 also partially overlap each other in the immovable area $Ar_1$, if any electrostatic attractive force is generated in the immovable area $Ar_1$, the influence thereof exerted on the displacement of the movable section 521 is extremely small and negligible as described above.

Functions and Advantages of Second Embodiment

In the present embodiment, the first electrostatic actuator 56 has the annular actuator 56C and the two first partial actuators 56D. The two first partial actuators 56D are each formed of the region where the area composed of the first partial electrode 561A and the first extending section 561B1 and the area composed of the third partial electrode 562A and the third extending section 562B1 overlap each other in the filter plan view, and are point-symmetrical about the filter center point O.

Further, the annular actuator 56C is disposed in the region where the first annular section 561B2 and the third annular section 562B2 overlap each other so as to form the symmetrical shape about the filter center point O. Therefore, the first electrostatic actuator 56 has the symmetrical shape about the filter center point O.

Further, the second electrostatic actuator 57 has the two second partial actuators 57C. These two second partial actuators 57C are each formed of the region where the area composed of the second partial electrode 571A and the second extending section 571B1 and the area composed of the fourth partial electrode 572A and the fourth extending section 572B1 overlap each other in the filter plan view, and are point-symmetrical about the filter center point O.

Therefore, similarly to the first embodiment described above, also in the present embodiment, it is possible to deflect the holding section 522 in a balanced manner when driving the first electrostatic actuator 56 and the second electrostatic actuator 57 with the voltage control section 15, and thus, it is possible to displace the movable section 521 toward the stationary substrate 51 in the state of keeping the parallelism between the stationary reflecting film 54 and the movable reflecting film 55. Thus, it is possible to perform accurate gap control of the inter-reflecting film gap G1.

Third Embodiment

Next, a variable wavelength interference filter according to a third embodiment of the invention will be explained.

In the first embodiment and the second embodiment described above, there is exemplified the configuration in which the two first partial electrodes 561A, the two second partial electrodes 571A, the two third partial electrodes 562A, and the two fourth partial electrodes 572A are disposed point-symmetrically about the filter center point O. In the case in which the number of each of the partial electrodes 561A, 571A, 562A, and 572A is an even number as described above, it becomes possible to arrange them point-symmetrically about the filter center point O. In contrast, in the case in which the number of each of the partial electrodes 561A, 571A, 562A, and 572A is an odd number, it is not achievable to arrange them point-symmetrically about the filter center point O.

As the third embodiment, there is exemplified an electrode configuration in the case in which the number of each of the partial electrodes 561A, 571A, 562A, and 572A is an odd number (three in the present embodiment).

Figure 10:
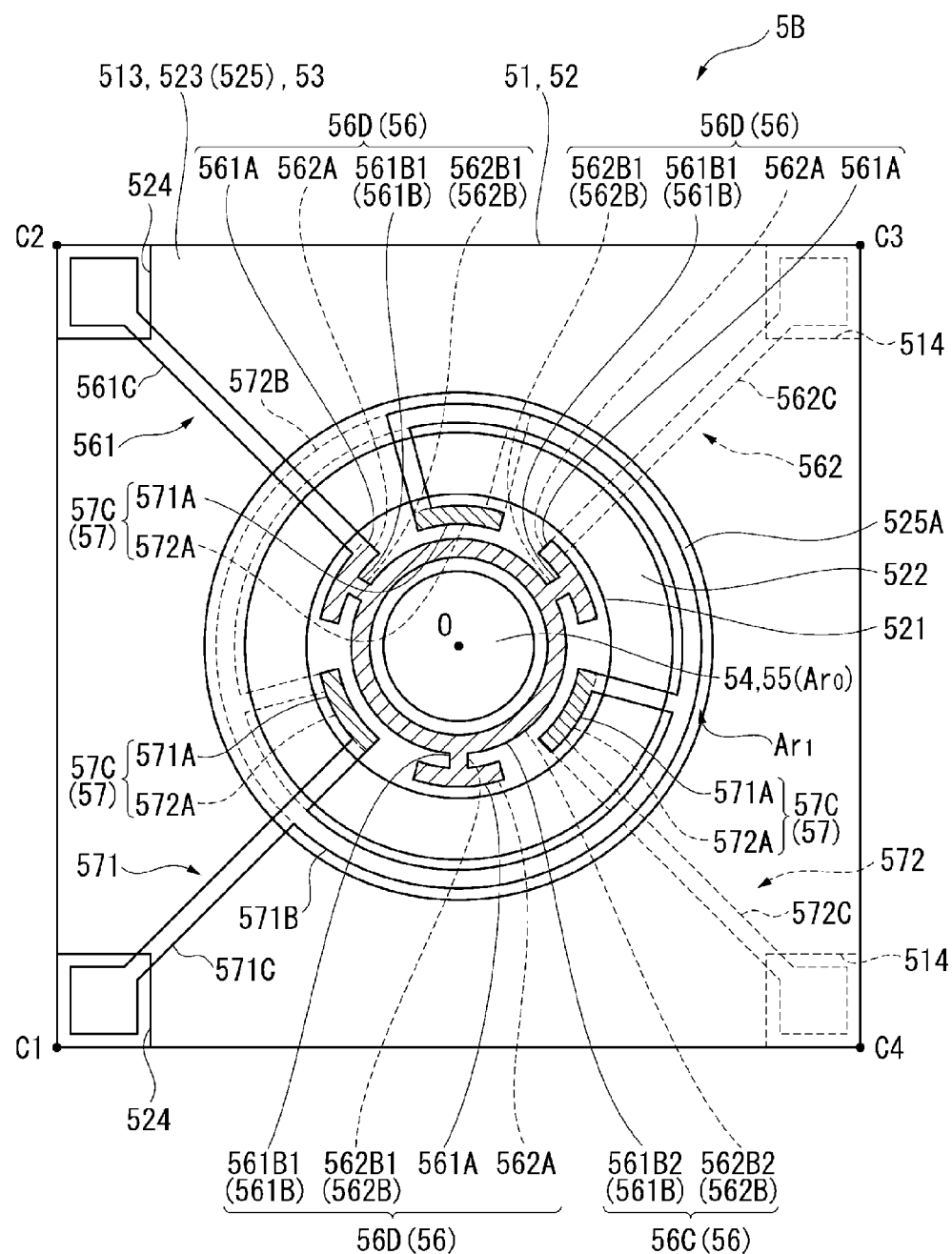
FIG. 10 is a plan view showing a variable wavelength interference filter according to a third embodiment.

FIG. 10 is a plan view showing a variable wavelength interference filter 5B according to the third embodiment.

As shown in FIG. 10, the variable wavelength interference filter 5B according to the present embodiment is provided with the first electrode 561 and the second electrode 571 disposed on the stationary substrate 51, and the third electrode 562 and the fourth electrode 572 disposed on the movable substrate 52 similarly to the first and second embodiments.

The first electrode 561 is provided with three first partial electrodes 561A, a first connection electrode 561B for connecting the three first partial electrodes 561A to each other, and a first extraction electrode 561C extending from one of the first partial electrodes 561A toward the vertex C2. Here, the three first partial electrodes 561A have the same shape, and are disposed at positions with regular angular intervals with respect to the filter center point O, and with equal distances from the filter center point O.

Further, the third electrode 562 is provided with three third partial electrodes 562A having the same shapes as those of the first partial electrodes 561A, and overlapping the first partial electrodes 561A in the filter plan view, a third connection electrode 562B for connecting the three third partial electrodes 562A to each other, and a third extraction electrode 562C extending from one of the third partial electrodes 562A toward the vertex C3.

Further, similarly to the second embodiment, the first connection electrode 561B of the present embodiment is provided with first extending sections 561B1 each extending from the center of the inside arc of the first partial electrode 561A toward the filter center point O, and a first annular section 561B2 disposed inside the first partial electrodes 561A and outside the reflecting film installation section 512. Further, the third connection electrode 562B is similarly provided with third extending sections 562B1 each extending from the center of the inside arc of the third partial electrode 562A toward the filter center point O, and a third annular section 562B2 disposed inside the third partial electrodes 562A and outside the movable reflecting film 55.

In such a configuration, similarly to the second embodiment, the first electrostatic actuator 56 is provided with three first partial actuators 56D each formed of an area composed of the first partial electrode 561A and the first extending section 561B1 and an area composed of the third partial electrode 562A and the third extending section 562B1 overlapping each other, and an annular actuator 56C formed of an annular opposed area where the first annular section 561B2 and the third annular section 562B2 overlap each other. The three first partial actuators 56D are formed to have the same shape, and are disposed at positions with regular angular intervals with respect to the filter center point O and with equal distances from the filter center point O. Further, the annular actuator 56C has a symmetrical shape about the filter center point O.

Therefore, the first electrostatic actuator 56 of the present embodiment has a symmetrical shape about the filter center point O, and it becomes possible to displace the movable section 521 in the state of keeping the parallelism between the stationary reflecting film 54 and the movable reflecting film 55 in the case in which the electrostatic attractive force is generated due to application of the voltage.

The second electrode 571 is provided with three second partial electrodes 571A, a second connection electrode 571B for connecting the three second partial electrodes 571A to each other, and a second extraction electrode 571C extending from the second connection electrode 571B toward the vertex C1. Here, the three second partial electrodes 571A have the same shape, and are disposed at positions with regular angular intervals with respect to the filter center point O, and with equal distances from the filter center point O.

Further, the fourth electrode 572 is provided with fourth partial electrodes 572A having the same shapes as those of the second partial electrodes 571A, and overlapping the second partial electrodes 571A in the filter plan view, a fourth connection electrode 572B for connecting the fourth partial electrodes 572A to each other, and a fourth extraction electrode 572C extending from the fourth connection electrode 572B toward the vertex C4.

Here, as shown in FIG. 10, the second connection electrode 571B and the fourth connection electrode 572B of the present embodiment do not overlap each other in the filter plan view in an area provided with the movable section 521 and the holding section 522, and have regions overlapping each other in the immovable area $Ar_1$.

In such a configuration, the second electrostatic actuator 57 is provided with three second partial actuators 57C each formed of a region where the second partial electrode 571A and the fourth partial electrode 572A overlap each other. The three second partial actuators 57C are formed to have the same shape, and are disposed at positions with regular angular intervals with respect to the filter center point O and with equal distances from the filter center point O. Therefore, the second electrostatic actuator 57 of the present embodiment has a symmetrical shape about the filter center point O, and it becomes possible to displace the movable section 521 in the state of keeping the parallelism between the stationary reflecting film 54 and the movable reflecting film 55 in the case in which the electrostatic attractive force is generated due to application of the voltage.

Functions and Advantages of Third Embodiment

Similarly to the second embodiment described above, also in the present embodiment, the first electrostatic actuator 56 is provided with the plurality of first partial actuators 56D and the annular actuator 56C. Further, the first partial actuators 56D are formed to have the same shape, and are disposed at positions with regular angular intervals with respect to the filter center point O and with equal distances from the filter center point O. Therefore, the electrostatic attractive forces generated in the respective first partial actuators 56D can be made to act in a balanced manner with respect to the filter center point O. Further, the annular actuator 56C has the annular shape centered on the filter center point O, and therefore forms a symmetrical shape about the filter center point O, and thus, it is possible to make the electrostatic attractive force act in a balanced manner with respect to the filter center point O.

Thus, the first electrostatic actuator 56 can control the gap amount of the inter-reflecting film gap G1 in the state of keeping the parallelism between the stationary reflecting film 54 and the movable reflecting film 55 without tilting the movable section 521.

Similarly, the second electrostatic actuator 57 is provided with the plurality of second partial actuators 57C, and these second partial actuators 57C are formed to have the same shape, and are disposed at positions with regular angular intervals with respect to the filter center point O and with equal distances from the filter center point O. Therefore, the second electrostatic actuator 57 can control the gap amount of the inter-reflecting film gap G1 in the state of keeping the parallelism between the stationary reflecting film 54 and the movable reflecting film 55 without tilting the movable section 521.

Fourth Embodiment

Next, a variable wavelength interference filter according to a fourth embodiment of the invention will be explained.

In the first, second, and third embodiments described above, the first electrode 561 and the second electrode 571 are configured as separate electrodes, and the third electrode 562 and the fourth electrode 572 are configured as separate electrodes. However, it is also possible to set the third electrode 562 and the fourth electrode 572 provided to the movable substrate 52 to a reference potential (e.g., the ground potential), and in such a case, the third electrode 562 and the fourth electrode 572 can be formed with a single common electrode.

The fourth embodiment is the example of forming the third electrode 562 and the fourth electrode 572 as a common electrode, and the specific configuration thereof will hereinafter be explained.

Figure 11:
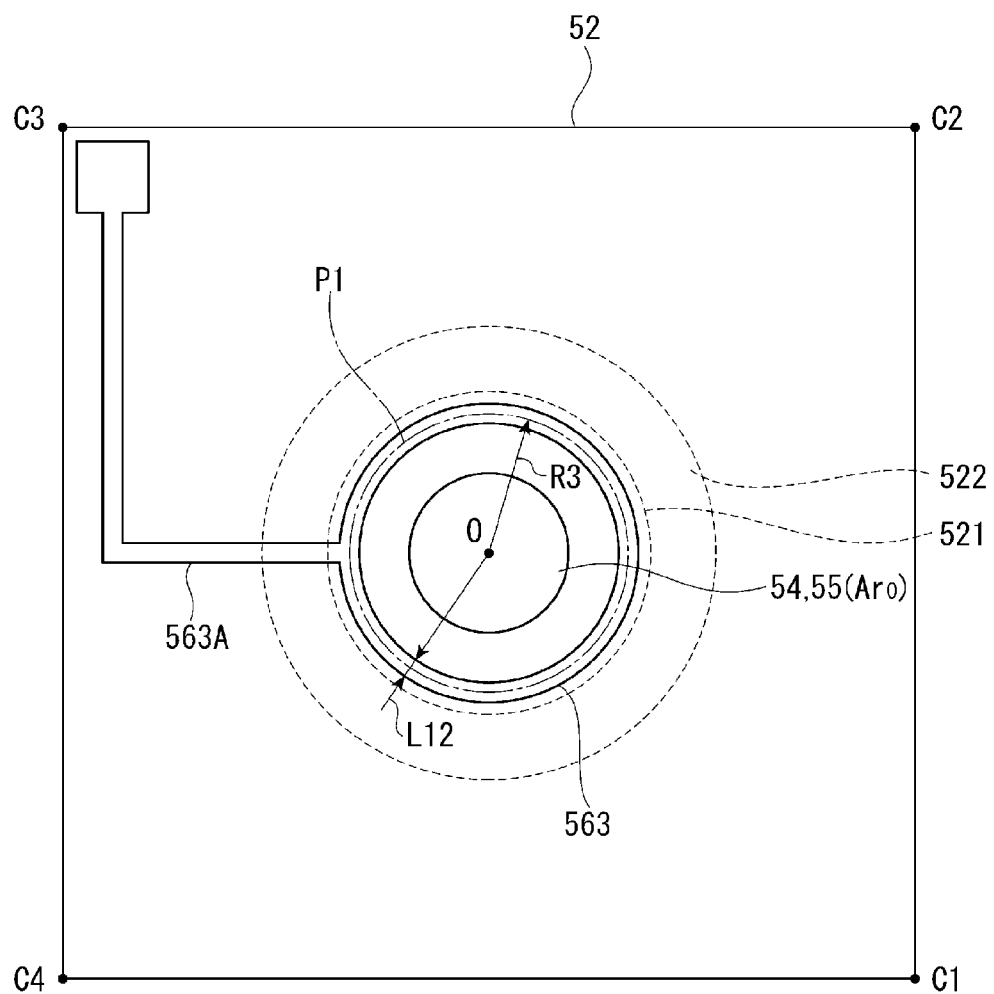
FIG. 11 is a plan view of a movable substrate of a fourth embodiment viewed from a stationary substrate side.

FIG. 11 is a plan view of the movable substrate 52 in the fourth embodiment viewed from the stationary substrate 51 side.

As shown in FIG. 11, the movable substrate 52 is provided with a common electrode 563 having an annular shape along the imaginary circle P1 with the width dimension of L12.

The common electrode 563 is provided with an extraction electrode 563A extending to the vertex C3, and the extraction electrode 563A is connected to, for example, the ground (GND) in the voltage control section 15.

It should be noted that the configuration of the stationary substrate 51 is assumed to be substantially the same as that of the first embodiment described above.

In such a variable wavelength interference filter, the first partial actuators 56A, 56B are each formed of a region where the first partial electrode 561A and the common electrode 563 overlap each other in the filter plan view, and the second partial actuators 57A, 57B are each formed of a region where the second partial electrode 571A and the common electrode 563 overlap each other. In other words, it results that in the present embodiment, similarly to the first embodiment, there are formed the first electrostatic actuator 56 composed of the first partial actuator 56A and the first partial actuator 56B arranged point-symmetrically with each other about the filter center point O, and the second electrostatic actuator 57 composed of the second partial actuator 57A and the second partial actuator 57B arranged point-symmetrically with each other about the filter center point O.

Functions and Advantages of Fourth Embodiment

In the present embodiment, the movable substrate 52 is provided with the common electrode 563 disposed along the imaginary circle P1 and having the width dimension of L12.

Therefore, it is possible to form the first partial actuator 56A and the first partial actuator 56B having the same shapes as those of the first embodiment using the regions where the first partial electrodes 561A provided to the stationary substrate 51 and the common electrode 563 overlap each other. Therefore, similarly to the first embodiment described above, the first electrostatic actuator 56 can control the gap amount of the inter-reflecting film gap G1 in the state of keeping the parallelism between the stationary reflecting film 54 and the movable reflecting film 55 without tilting the movable section 521.

Similarly, it is possible to form the second partial actuator 57A and the second partial actuator 57B having the same shapes as those of the first embodiment using the regions where the second partial electrodes 571A provided to the stationary substrate 51 and the common electrode 563 overlap each other. Therefore, similarly to the first embodiment described above, the second electrostatic actuator 57 can control the gap amount of the inter-reflecting film gap G1 in the state of keeping the parallelism between the stationary reflecting film 54 and the movable reflecting film 55 without tilting the movable section 521.

Further, according to the present embodiment, simplification of the electrode configuration in the movable substrate 52 can be achieved compared to the first through third embodiments described above, and thus, the miniaturization of the variable wavelength interference filter 5 can also be achieved.

Further, although the example of using the stationary substrate 51 of the first embodiment is described in the present embodiment, the invention is not limited thereto. Specifically, since the electrode configuration of the movable substrate 52 is simplified, the electrode configuration in the stationary substrate 51 can also be simplified, and it is possible to dispose the first connection electrode 561B, the first extraction electrode 561C, the second connection electrode 571B, and the second extraction electrode 571C at positions not overlapping the annular common electrode 563, and the extraction electrode 563A extending from the common electrode 563 to the vertex C3. For example, it is also possible to adopt the configuration in which the first connection electrode 561B is disposed on the side C2-C3 side of the reflecting film installation section 512 similarly to the first embodiment, and the second connection electrode 571B is disposed on the side C1-C4 side of the reflecting film installation section 512. In this case, the non-bonding section 525A and the immovable area $Ar_1$ become unnecessary, and the miniaturization of the variable wavelength interference filter 5 can be achieved accordingly.

Fifth Embodiment

Next, an optical filter device according to a fifth embodiment of the invention will be explained.

In the spectroscopic measurement device 1 according to the first embodiment described above, there is adopted the configuration in which the variable wavelength interference filter 5 is directly provided to the optical module 10. However, some optical modules have a complicated configuration, and there are some cases in which it is difficult to directly provide the variable wavelength interference filter 5 in particular to a small-sized optical module. In the present embodiment, an optical filter device, which makes it possible to easily install the variable wavelength interference filter 5 (5A, 5B) also to such an optical module, will hereinafter be explained.

Figure 12:
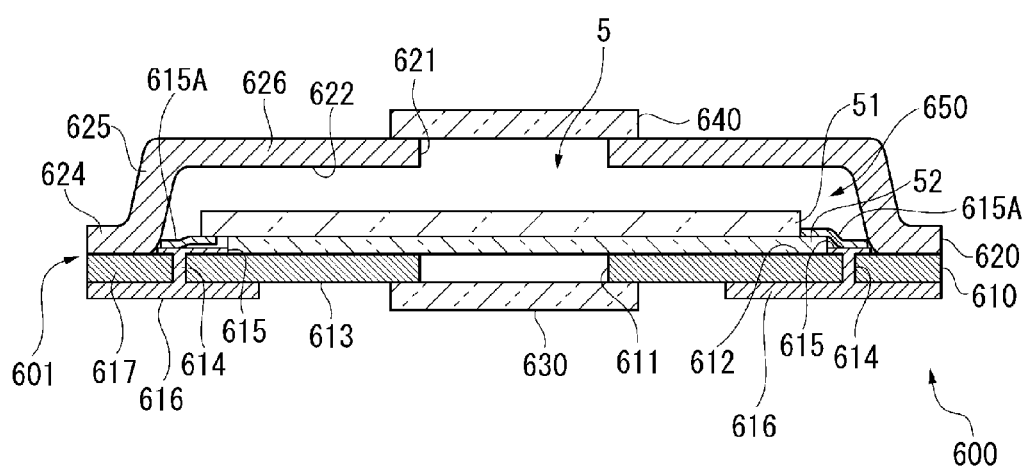
FIG. 12 is a cross-sectional view showing a schematic configuration of an optical filter device according to a fifth embodiment.

FIG. 12 is a cross-sectional view showing a schematic configuration of the optical filter device according to the fifth embodiment of the invention.

As shown in FIG. 12, the optical filter device 600 is provided with the variable wavelength interference filter 5, and a housing 601 for housing the variable wavelength interference filter 5. It should be noted that although in the present embodiment there is exemplified the variable wavelength interference filter 5 as an example, it is also possible to adopt a configuration in which one of the variable wavelength interference filters 5A, 5B is used.

The housing 601 is provided with a base substrate 610, a lid 620, a base-side glass substrate 630, and a lid-side glass substrate 640.

The base substrate 610 is formed of, for example, a single layer ceramic substrate. The movable substrate 52 of the variable wavelength interference filter 5 is installed to the base substrate 610. As a method of installation of the movable substrate 52 to the base substrate 610, it is possible to adopt a method of disposing it via, for example, an adhesive, or a method of disposing it by fitting it to, for example, another fixation member. Further, the base substrate 610 is provided with a light passage hole 611 opening in an area opposed to the optical interference region $Ar_0$. Further, the base-side glass substrate 630 is bonded so as to cover the light passage hole 611. As the bonding method of the base-side glass substrate 630, for example, glass frit bonding using a glass frit, which is a scrap of glass obtained by melting a glass material at high temperature and then rapidly cooling it, and bonding with epoxy resin or the like can be used.

On a base inner surface 612 opposed to the lid 620 of the base substrate 610, there are disposed inner terminal sections 615 so as to respectively correspond to the extraction electrodes 561C, 571C, 562C, and 572C (the extraction electrodes 561C, 571C, and 563A in the case of using the variable wavelength interference filter according to the fourth embodiment) of the variable wavelength interference filter 5. It should be noted that the connection between the extraction electrodes 561C, 571C, 562C, and 572C and the respective inner terminal sections 615 can be achieved using, for example, FPC 615A, and bonding therebetween is achieved using, for example, Ag paste, an anisotropic conductive film (ACF), and anisotropic conductive paste (ACP). It should be noted that the Ag paste with little outgas is preferably used for keeping the internal space 650 in the vacuum state. Further, wiring connection with, for example, wire bonding can also be performed besides the connection using the FPC 615A.

Further, the base substrate 610 is provided with through holes 614 formed so as to correspond to the positions where the respective inner terminal sections 615 are disposed, and the inner terminal sections 615 are connected to outer terminal sections 616 disposed on a base outer surface 613 of the base substrate 610 on the opposite side to the base inner surface 612 via electrically conductive members with which the through holes 614 are filled, respectively.

Further, the outer peripheral portion of the base substrate 610 is provided with a base bonding section 617 to be bonded to the lid 620.

As shown in FIG. 12, the lid 620 is provided with a lid bonding section 624 to be bonded to the base bonding section 617 of the base substrate 610, a sidewall section 625 continuing from the lid bonding section 624 and rising in the direction of departing from the base substrate 610, and a top surface section 626 continuing from the sidewall section 625 and covering the stationary substrate 51 side of the variable wavelength interference filter 5. The lid 620 can be formed of an alloy such as kovar, or metal.

The lid 620 is adhesively bonded to the base substrate 610 by the lid bonding section 624 and the base bonding section 617 of the base substrate 610 bonded to each other.

As the bonding method, there can be cited, for example, soldering with brazing silver or the like, sealing with a eutectic alloy layer, welding with low-melting-point glass, glass adhesion, glass frit bonding, and adhesion with epoxy resin, besides laser welding. These bonding methods can arbitrarily be selected in accordance with the materials of the base substrate 610 and the lid 620, the bonding environment, and the like.

The top surface section 626 of the lid 620 is set to be parallel to the base substrate 610. The top surface section 626 is provided with a light passage hole 621 in an opening manner formed in an area opposed to the optical interference region $Ar_0$ of the variable wavelength interference filter 5. Further, the lid-side glass substrate 640 is bonded so as to cover the light passage hole 621. As the bonding method of the lid-side glass substrate 640, the glass frit bonding, adhesion with epoxy resin, and the like can be used similarly to the bonding of the base-side glass substrate 630.

Functions and Advantages of Fifth Embodiment

In the optical filter device 600 according to the present embodiment, since the variable wavelength interference filter 5 is protected by the housing 601, the characteristic change of the variable wavelength interference filter 5 due to foreign matters, gases and the like included in the atmosphere can be prevented, and further, breakage of the variable wavelength interference filter 5 due to external factors can be prevented. Further, since invasion of charged particles can be prevented, charging of the electrodes 561, 571, 562, and 572 can be prevented. Therefore, generation of a coulomb force due to charging can be suppressed, and thus, parallelism between the reflecting films 54, 55 can more surely be maintained.

Further, in the case of, for example, carrying the variable wavelength interference filter 5 manufactured in a factory to an assembly line for assembling the optical modules or the electronic apparatuses, it becomes possible to safely carry the variable wavelength interference filter 5 protected by the optical filter device 600.

Further, since the optical filter device 600 is provided with outer terminal section 616 exposed on the outer peripheral surface of the housing 601, it becomes possible to easily provide wiring when installing it to the optical module or the electronic apparatus.

Other Embodiments

It should be noted that the invention is not limited to the embodiments described above, but includes modifications, improvements, and the like within a range where the advantages of the invention can be achieved.

Although in the first embodiment there is described the example in which the second connection electrode 571B is disposed in the immovable area $Ar_1$, it is also possible to adopt the configuration in which both of the first connection electrode 561B and the second connection electrode 571B are disposed inside the imaginary circle P1. In this case, it is possible to dispose both of the third connection electrode 562B and the fourth connection electrode 572B in the immovable area $Ar_1$.

Further, it is also possible to adopt the configuration in which both of the first connection electrode 561B and the fourth connection electrode 572B are disposed in the immovable area Ar1, and the third connection electrode 562B and the fourth connection electrode 572B are disposed between the imaginary circle P1 and the movable reflecting film 55.

Although in the first embodiment, the second connection electrode 571B is connected to the second partial electrode 571A, which is disposed on the side C2-C3 side, at the center position of the arc, and the second connection electrode 571B is connected to the second partial electrode 571A, which is disposed on the side C1-C4 side, at an end of the arc, the invention is not limited thereto. Specifically, the connection position of the second connection electrode 571B can be located anywhere on the outer peripheral edge of the second partial electrode 571A, and it is sufficient that the connection position is disposed at a position located within the area corresponding to at least the movable section 521 or the holding section 522 and not overlapping the fourth connecting electrode 572B or the fourth extraction electrode 572C described later provided to the movable substrate 52 in the filter plan view.

Although in the first embodiment there is described the example in which the first extraction electrode 561C is connected to the first partial electrode 561A disposed on the side C1-C2 side, it is also possible to adopt the configuration in which the first extraction electrode 561C is connected to the first partial electrode 561A disposed on the side C3-C4 side, it is also possible to connect the first extraction electrode 561C to both of the two first partial electrodes 561A, or it is also possible to adopt the configuration in which the first extraction electrode 561C is connected to the first connection electrode 561B. The same applies to the third extraction electrode 562C, and it is also possible to adopt the configuration in which the third extraction electrode 562C is connected to the other of the third partial electrodes 562A, the configuration in which the third extraction electrode 562C is connected to the third connection electrode 562B, and the like.

Further, the same applies to the second extraction electrode 571C, and although there is described the example in which the second extraction electrode 571C is connected to the second connection electrode 571B, it is also possible to connect the second extraction electrode 571C to either one of the two second partial electrodes 571A, and it is also possible to adopt the configuration in which the second extraction electrode 571C is connected to both of the two second partial electrodes 571A. The same applies to the fourth extraction electrode 572C.

Although in the second embodiment and the third embodiment there is exemplified the configuration in which the first extending section 561B1 and the third extending section 562B1 overlap each other in the filter plan view, it is also possible to adopt the configuration in which the first extending section 561B1 and the third extending section 562B1 do not overlap each other.

Further, in the filter plan view, although there is described the example of disposing the extraction electrodes 561C, 571C, 562C, and 572C do not overlap any other electrodes in the area overlapping the movable section 521 or the holding section 522, the invention is not limited thereto. For example, in the case in which the region where the first extraction electrode 561C and the third extraction electrode 562C overlap each other has a symmetrical shape about the filter center point O, and the case in which there is disposed a plurality of such overlapping regions, and the regions have the same shape and are located at regular angular intervals with respect to the filter center point O and with the same distance from the filter center point O, it is possible for the first extraction electrode 561C and the third extraction electrode 562C to overlap each other.

As described above, in the invention, it is sufficient that the electrodes 561, 571, 562, and 572 are disposed so that the first electrostatic actuator 56 and the second electrostatic actuator 57 each have a symmetrical shape about the filter center point O in the filter plan view in the area where at least the movable section 521 and the holding section 522 are disposed.

Although the electrostatic actuator is exemplified as the first actuator and the second actuator, the invention is not limited thereto. For example, an actuator for changing the inter-reflecting film gap due to the magnetic force using an induction coil provided to the first substrate and an induction coil provided to the second substrate can be used as the first actuator and the second actuator.

Besides the above, it is also possible to adopt the configuration in which, for example, the inter-reflecting film gap can be varied by a piezoelectric actuator having a lower electrode layer, a piezoelectric film, and an upper electrode layer stacked with each other.

Further, although the spectroscopic measurement device 1 is cited in each of the embodiments described above as an example of the electronic apparatus according to the invention, the drive method of the variable wavelength interference filter, the optical module, and the electronic apparatus according to the invention can be applied in a variety of fields besides the above.

Figure 13:
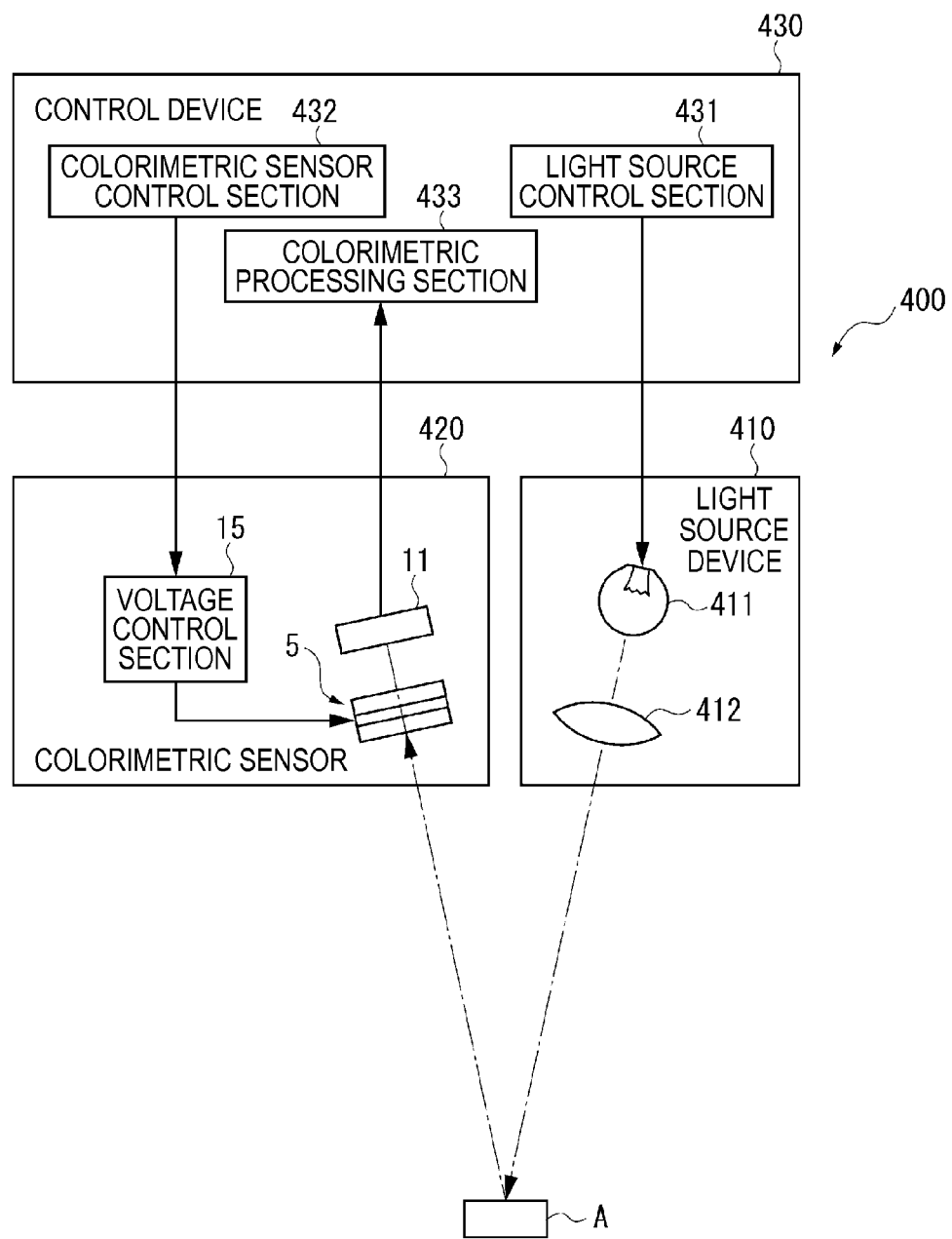
FIG. 13 is a schematic diagram showing a colorimetric device (an electronic apparatus) equipped with the variable wavelength interference filter according to an embodiment of the invention.

For example, as shown in FIG. 13, it is also possible to apply the electronic apparatus according to the invention to a colorimetric device for measuring colors.

FIG. 13 is a block diagram showing an example of the colorimetric device 400 equipped with the variable wavelength interference filter.

As shown in FIG. 13, the colorimetric device 400 is provided with a light source device 410 for emitting light to a test object A, a colorimetric sensor 420 (an optical module), and a control device 430 for controlling an overall operation of the colorimetric device 400. Further, the colorimetric device 400 is a device for making the light, which is emitted from the light source device 410, be reflected by the test object A, receiving the test target light thus reflected using the colorimetric sensor 420, and analyzing and then measuring the chromaticity of the test target light, namely the color of the test object A, based on the detection signal output from the colorimetric sensor 420.

The light source device 410 is provided with a light source 411 and a plurality of lenses 412 (one of the lenses is shown alone in FIG. 13), and emits, for example, reference light (e.g., white light) to the test object A. Further, it is possible for the plurality of lenses 412 to include a collimator lens, and in this case, the light source device 410 converts the reference light emitted from the light source 411 into parallel light with the collimator lens, and then emits it from the projection lens not shown toward the test object A. It should be noted that although in the present embodiment the colorimetric device 400 provided with the light source device 410 is described as an example, in the case in which, for example, the test object A is a light emitting member such as a liquid crystal panel, it is also possible to adopt a configuration not provided with the light source device 410.

As shown in FIG. 13, the colorimetric sensor 420 is provided with the variable wavelength interference filter 5, the detector 11 for receiving the light transmitted through the variable wavelength interference filter 5, and the voltage control section 15 for varying the wavelength of the light to be transmitted through the variable wavelength interference filter 5. Further, the colorimetric sensor 420 is provided with an entrance optical lens (not shown) disposed at a position opposed to the variable wavelength interference filter 5, the entrance optical lens guiding the reflected light (the test target light), which has been reflected by the test object A, into the inside thereof. Further, the colorimetric sensor 420 disperses the light with a predetermined wavelength out of the test target light input from the entrance optical lens using the variable wavelength interference filter 5, and then receives the light thus dispersed using the detector 11. It should be noted that it is also possible to adopt the configuration in which any one of the variable wavelength interference filters 5A, 5B, and the optical filter device 600 described above is disposed instead of the variable wavelength interference filter 5.

The control device 430 controls an overall operation of the colorimetric device 400.

As the control device 430, a general-purpose personal computer, a handheld terminal, a colorimetry-dedicated computer, and the like can be used. Further, as shown in FIG. 13, the control device 430 is configured including a light source control section 431, a colorimetric sensor control section 432, a colorimetric processing section 433, and the like.

Further, the light source control section 431 is connected to the light source device 410, and outputs a predetermined control signal to the light source device 410 based on, for example, a setting input by the user to thereby make the light source device 410 emit white light with a predetermined brightness.

The colorimetric sensor control section 432 is connected to the colorimetric sensor 420, and sets the wavelength of the light to be received by the colorimetric sensor 420 based on, for example, the setting input by the user, and then outputs the control signal instructing to detect the intensity of the received light with this wavelength to the colorimetric sensor 420. Thus, the voltage control section 15 of the colorimetric sensor 420 applies the voltage to the electrostatic actuator 56 based on the control signal to thereby drive the variable wavelength interference filter 5.

The colorimetric processing section 433 analyzes the chromaticity of the test object A based on the light reception intensity detected by the detector 11.

Further, as another example of the electronic apparatus according to the invention, there can be cited an optical-base system for detecting presence of a specific material. As such a system, there can be exemplified, for example, an in-car gas leak detector adopting a spectroscopic measurement method using the variable wavelength interference filter according to the invention and detecting a specific gas with high sensitivity, and a gas detection device such as an optoacoustic noble-gas detector for breath-testing.

An example of such a gas detection device will hereinafter be explained with reference to the accompanying drawings.

Figure 14:
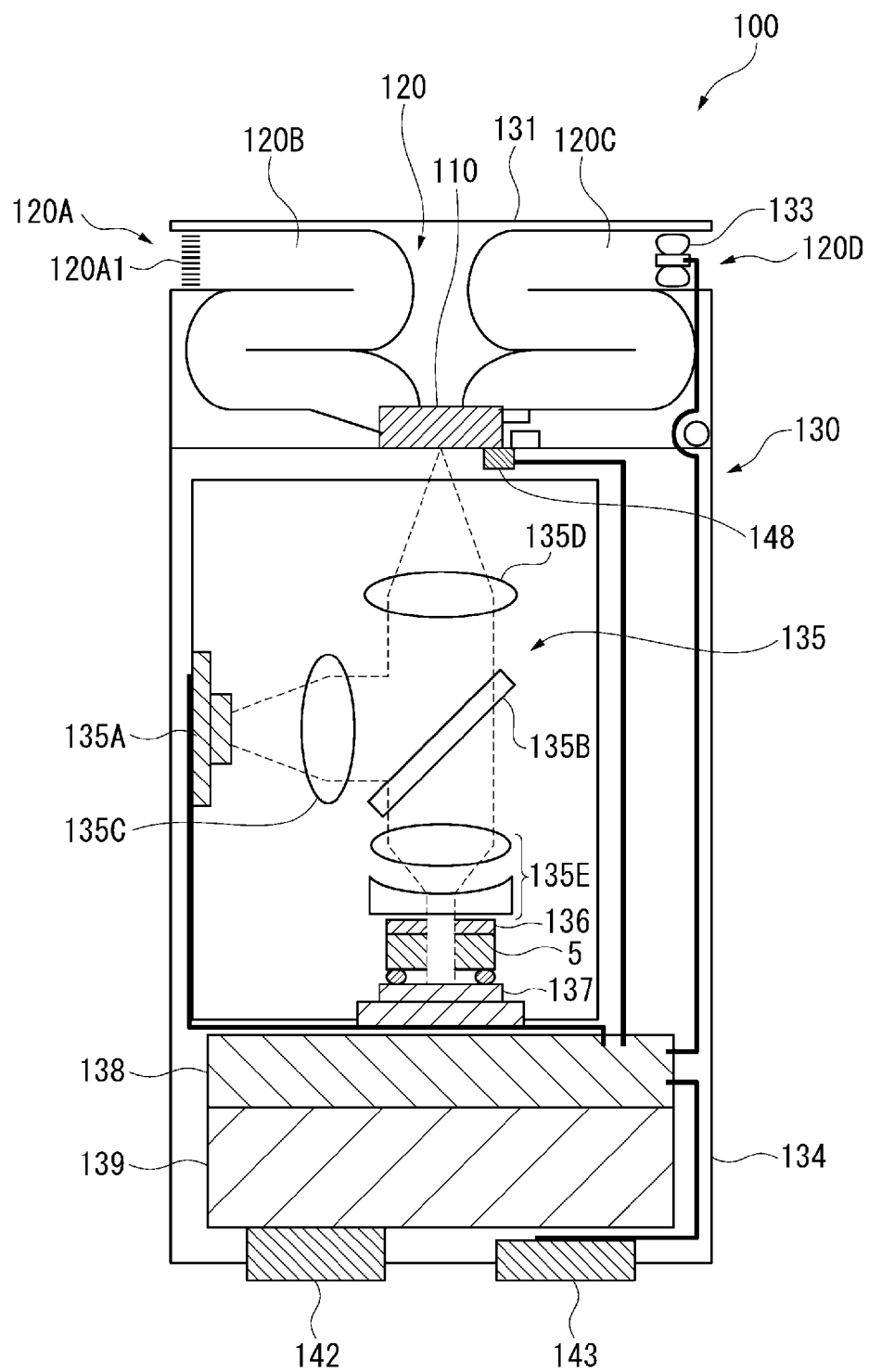
FIG. 14 is a schematic diagram showing a gas detection device (an electronic apparatus) equipped with the variable wavelength interference filter according to an embodiment of the invention.

FIG. 14 is a schematic diagram showing an example of a gas detection device provided with the variable wavelength interference filter.

Figure 15:
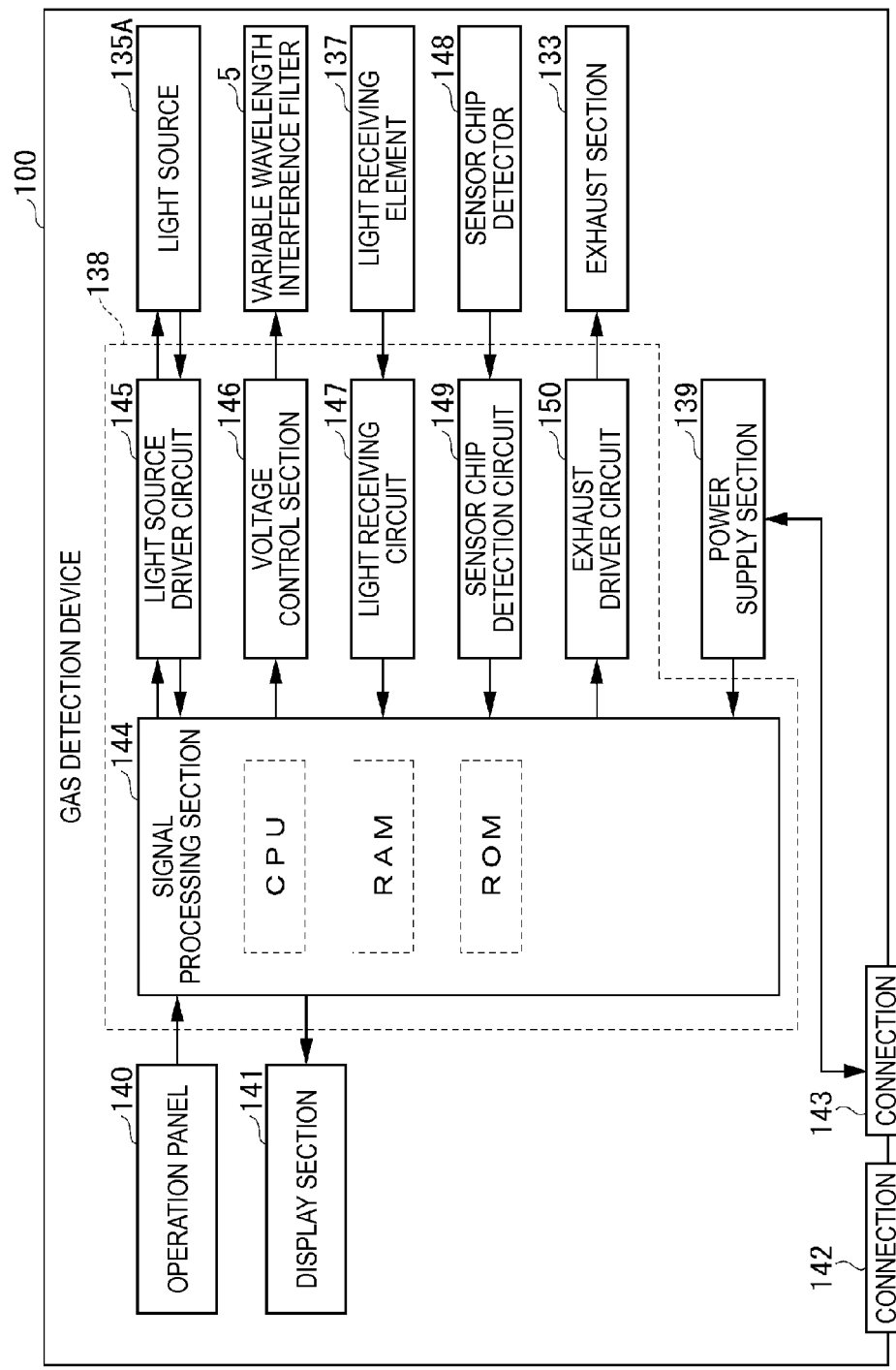
FIG. 15 is a block diagram showing a configuration of a control system of the gas detection device shown in FIG. 14.

FIG. 15 is a block diagram showing a configuration of a control system of the gas detection device shown in FIG. 14.

As shown in FIG. 14, the gas detection device 100 is configured including a sensor chip 110, a channel 120 provided with a suction port 120A, a suction channel 120B, an exhaust channel 120C, and an exhaust port 120D, and a main body section 130.

The main body section 130 is composed of a detection device (an optical module) including a sensor section cover 131 having an opening to which the channel 120 is detachably attached, an exhaust section 133, a housing 134, an optical section 135, a filter 136, the variable wavelength interference filter 5, a light receiving element 137 (a detection section), and the like, a control section 138 (a processing section) for processing the signal thus detected and controlling the detection section, a power supply section 139 for supplying electrical power, and the like. It should be noted that it is also possible to adopt the configuration in which any one of the variable wavelength interference filters 5A, 5B, and the optical filter device 600 described above is disposed instead of the variable wavelength interference filter 5. Further, the optical section 135 is composed of a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 15, on the surface of the gas detection device 100, there are disposed an operation panel 140, a display section 141, a connection section 142 for an interface with the outside, and the power supply section 139. In the case in which the power supply section 139 is a secondary cell, a connection section 143 for the battery charge can also be provided.

Further, as shown in FIG. 15, the control section 138 of the gas detection device 100 is provided with a signal processing section 144 composed of a CPU and the like, a light source driver circuit 145 for controlling the light source 135A, a voltage control section 146 for controlling the variable wavelength interference filter 5, a light receiving circuit 147 for receiving the signal from the light receiving element 137, a sensor chip detection circuit 149 for receiving the signal from a sensor chip detector 148 for reading a code of the sensor chip 110 to thereby detect presence or absence of the sensor chip 110, an exhaust driver circuit 150 for controlling the exhaust section 133, and the like.

Next, an operation of the gas detection device 100 described above will hereinafter be explained.

The sensor chip detector 148 is disposed inside the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, if, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information thereof is output to the signal processing section 144. Then, if the signal processing section 144 determines that the light source 135A is operating stably based on the information of the temperature and the light intensity input from the light source 135A, the signal processing section 144 controls the exhaust driver circuit 150 to operate the exhaust section 133. Thus, the gaseous sample including the target material (the gas molecule) to be detected is guided from the suction port 120A to the suction channel 120B, the inside of the sensor chip 110, the exhaust channel 120C, and the exhaust port 120D. It should be noted that the suction port 120A is provided with a dust filter 120A1, and relatively large dust, some water vapor, and the like are removed.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration, and the Rayleigh scattered light are generated.

The Rayleigh scattered light and the Raman scattered light pass through the optical section 135 and then enter the filter 136, and the Rayleigh scattered light is separated out by the filter 136, and the Raman scattered light enters the variable wavelength interference filter 5. Then, the signal processing section 144 outputs a control signal to the voltage control section 146. Thus, the voltage control section 146 drives each of the electrostatic actuators 56, 57 of the variable wavelength interference filter 5 in a similar manner to the first embodiment described above to make the variable wavelength interference filter 5 disperse the Raman scattered light corresponding to the gas molecules to be the detection target. Subsequently, if the light thus dispersed is received by the light receiving element 137, the light reception signal corresponding to the received light intensity is output to the signal processing section 144 via the light receiving circuit 147. On this occasion, the target Raman scattered light can be accurately taken out from the variable wavelength interference filter 5.

The signal processing section 144 compares the spectrum data of the Raman scattered light corresponding to the gas molecule to be the detection target obtained in such a manner as described above and the data stored in the ROM with each other to thereby determine whether or not the gas molecule is the target one, and thus the substance is identified. Further, the signal processing section 144 makes the display section 141 display the result information, or outputs the result information from the connection section 142 to the outside.

It should be noted that although in FIGS. 14 and 15 there is exemplified the gas detection device 100 for dispersing the Raman scattered light with the variable wavelength interference filter 5, and performing the gas detection based on the Raman scattered light thus dispersed, a gas detection device for identifying the gas type by detecting the absorbance unique to the gas can also be used. In this case, the gas sensor, which makes the gas flow into the sensor, and detects the light absorbed by the gas out of the incident light, is used as the optical module according to the invention. Further, the gas detection device for analyzing and determining the gas flowing into the sensor using such a gas sensor is cited as the electronic apparatus according to the invention. According also to such a configuration, it is possible to detect the component of the gas using the variable wavelength interference filter.

Further, as the system for detecting the presence of the specific substance, besides the gas detection described above, there can be cited a substance component analysis device such as a non-invasive measurement device of a sugar group using near-infrared dispersion, or a non-invasive measurement device of information of food, biological object, or mineral.

Hereinafter, as an example of the substance component analysis device described above, a food analysis device will be explained.

Figure 16:
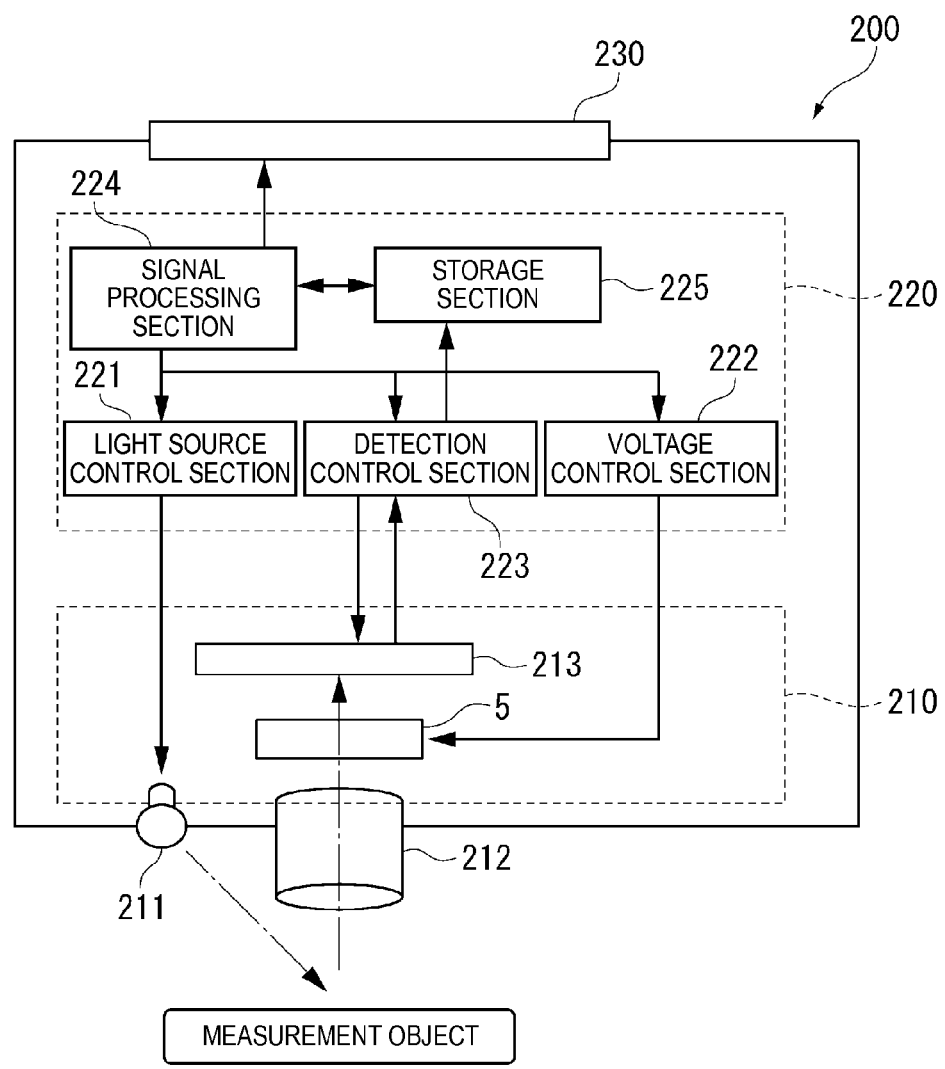
FIG. 16 is a diagram showing a schematic configuration of a food analysis device (the electronic apparatus) equipped with the variable wavelength interference filter according to an embodiment of the invention.

FIG. 16 is a diagram showing a schematic configuration of the food analysis device as an example of the electronic apparatus using the variable wavelength interference filter 5.

As shown in FIG. 16, the food analysis device 200 is provided with a detector 210 (the optical module), a control section 220, and a display section 230. The detector 210 is provided with a light source 211 for emitting light, an image pickup lens 212 to which the light from a measurement object is introduced, the variable wavelength interference filter 5 for dispersing the light thus introduced from the image pickup lens 212, and an image pickup section 213 (a detection section) for detecting the light thus dispersed. It should be noted that it is also possible to adopt the configuration in which any one of the variable wavelength interference filters 5A, 5B, and the optical filter device 600 described above is disposed instead of the variable wavelength interference filter 5.

Further, the control section 220 is provided with a light source control section 221 for performing lighting/extinction control of the light source 211 and brightness control in the lighting state, a voltage control section 222 for controlling the variable wavelength interference filter 5, a detection control section 223 for controlling the image pickup section 213 and obtaining a spectral image taken by the image pickup section 213, a signal processing section 224, and a storage section 225.

In the food analysis device 200, when the system is started up, the light source control section 221 controls the light source 211, and the light source 211 irradiates the measurement object with the light. Then, the light reflected by the measurement object passes through the image pickup lens 212 and then enters the variable wavelength interference filter 5. The variable wavelength interference filter 5 is driven with the driving method described in the first embodiment under the control by the voltage control section 222. Thus, the light with the target wavelength can be accurately taken out from the variable wavelength interference filter 5. Then, the light thus taken out is taken by the image pickup section 213 formed of, for example, a CCD camera. Further, the light thus taken is stored in the storage section 225 as the spectral image. Further, the signal processing section 224 controls the voltage control section 222 to vary the voltage value to be applied to the variable wavelength interference filter 5 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and the like can also be calculated based on the food components and the contents thus obtained. Further, by analyzing the spectral distribution in the image, it is possible to perform extraction of the portion with low freshness in the food as a test object, and further, it is also possible to perform detection of a foreign matter included in the food.

Then, the signal processing section 224 performs a process of making the display section 230 display the information of the components, the contents, the calorie, the freshness, and the like of the food as the test object obtained in such a manner as described above.

Further, although the example of the food analysis device 200 is shown in FIG. 16, it is also possible to use substantially the same configuration as the non-invasive measurement device of other information as described above. For example, it can be used as a biological analysis device for performing analysis of a biological component such as measurement and analysis of a biological fluid such as blood. If a device of detecting ethyl alcohol is provided as a device of measuring the biological fluid component such as blood as an example of such a biological analysis device, the device can be used as a device for detecting the influence of alcohol to the driver to thereby prevent driving under the influence of alcohol. Further, it can also be used as an electronic endoscopic system equipped with such a biological analysis device.

Further, it can also be used as a mineral analysis device for performing component analysis of minerals.

Further, the variable wavelength interference filter, the optical module, and the electronic apparatus according to the invention can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter provided to the optical module, and then making the light receiving section receive the light. Therefore, by processing the data in the light having each of the wavelengths using the electronic apparatus equipped with such a data extracting optical module, it is also possible to perform optical communication.

Further, the electronic apparatus can be applied to a spectroscopic camera for picking up the spectral image and a spectroscopic analysis device by dispersing the light with the variable wavelength interference filter according to the invention. As an example of such a spectroscopic camera, an infrared camera incorporating the variable wavelength interference filter can be cited.

Figure 17:
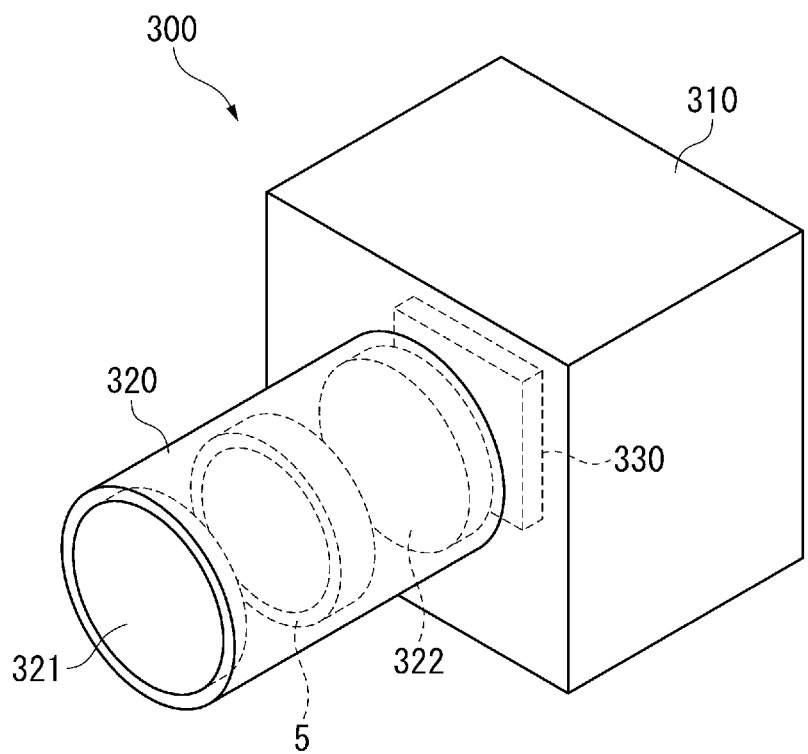
FIG. 17 is a diagram showing a schematic configuration of a spectroscopic camera (the electronic apparatus) equipped with the variable wavelength interference filter according to an embodiment of the invention.

FIG. 17 is a schematic diagram showing a schematic configuration of the spectroscopic camera. As shown in FIG. 17, the spectroscopic camera 300 is provided with a camera main body 310, an image pickup lens unit 320, and an image pickup section 330 (a detection section).

The camera main boy 310 is a part which is gripped and operated by the user.

The image pickup lens unit 320 is provided to the camera main body 310, and guides the image light input thereto to the image pickup section 330. Further, as shown in FIG. 17, the image pickup lens unit 320 is configured including an objective lens 321, an imaging lens 322, and the variable wavelength interference filter 5 disposed between these lenses. It should be noted that it is also possible to adopt the configuration in which any one of the variable wavelength interference filters 5A, 5B, and the optical filter device 600 described above is disposed instead of the variable wavelength interference filter 5.

The image pickup section 330 is formed of a light receiving element, and takes the image of the image light guided by the image pickup lens unit 320.

In such a spectroscopic camera 300, by transmitting the light with the wavelength to be the imaging object using the variable wavelength interference filter 5, the spectral image of the light with a desired wavelength can be taken. On this occasion, since the voltage control section (not shown) drives the variable wavelength interference filter 5 using the drive method according to the invention described in the first embodiment described above with respect to each of the wavelengths, it is possible to accurately take out the image light of the spectral image of the target wavelength.

Further, the variable wavelength interference filter according to the invention can be used as a band-pass filter, and can also be used as, for example, an optical laser device for dispersing and transmitting only the light with a narrow band centered on a predetermined wavelength out of the light in a predetermined wavelength band emitted by the light emitting element using the variable wavelength interference filter.

Further, the variable wavelength interference filter according to the invention can be used as a biometric authentication device, and can be applied to, for example, an authentication device of blood vessels, a fingerprint, a retina, an iris, and the like using the light in a near infrared range or a visible range.

Further, the optical module and the electronic apparatus can be used as a concentration detection device. In this case, the infrared energy (the infrared light) emitted from the substance is dispersed by the variable wavelength interference filter and is then analyzed, and the concentration of the test object in a sample is measured.

As described above, the variable wavelength interference filter, the optical module, and the electronic apparatus according to the invention can be applied to any device for dispersing predetermined light from the incident light. Further, since the variable wavelength interference filter according to the invention can disperse the light with a plurality of wavelength components with a single device as described above, the measurement of the spectrum of a plurality of wavelengths and detection of a plurality of components can be performed with accuracy. Therefore, compared to the existing device of taking out desired wavelengths with a plurality of devices, downsizing of the optical module and the electronic apparatus can be promoted, and the optical module and the electronic apparatus can preferably be used as, for example, a portable or an in-car optical device.

Besides the above, specific structures to be adopted when putting the invention into practice can arbitrarily be replaced with other structures and the like within the range in which the advantages of the invention can be achieved.

The entire disclosure of Japanese Patent Application No. 2012-094517 filed Apr. 18, 2012 is hereby expressly incorporated by reference.

What is claimed is:

1. A variable wavelength interference filter comprising:
   a first substrate including a first electrode and a second electrode;
   a second substrate opposed to the first substrate, the second substrate including a third electrode and a fourth electrode, the third and fourth electrodes being opposed to the first and second electrodes, respectively;
   a first reflecting film provided to the first substrate;
   a second reflecting film provided to the second substrate, and opposed to the first reflecting film across a gap;
   a first actuator including the first electrode and the third electrode disposed outside an optical interference region where the first reflecting film and the second reflecting film overlap each other in a plan view of the first substrate and the second substrate, the first actuator selectively varying the gap between the first reflecting film and the second reflecting film; and
   a second actuator including the second electrode and the fourth electrode disposed outside the optical interference region in the plan view, and driven independently of the first actuator to vary the gap,
   wherein the first actuator has a plurality of first partial actuators disposed at regular angular intervals with respect to a point in the optical interference region, the first partial actuators having the same shape as each other in the plan view and being disposed at the same distance from the point as each other;
   the second actuator has a plurality of second partial actuators disposed at regular angular intervals with respect to the point in the optical interference region, the second partial actuators having the same shape as each other in the plan view and being disposed at the same distance from the point as each other;
   the first electrode includes:
      a plurality of first partial electrodes disposed outside the optical interference region in the plan view;
      a first connection electrode connecting the first partial electrodes to each other; and
      a first extraction electrode connected to at least one of the first partial electrodes and the first connection electrode;
   the second electrode includes:
      a plurality of second partial electrodes disposed outside the optical interference region in the plan view;
      a second connection electrode connecting the second partial electrodes to each other; and
      a second extraction electrode connected to at least one of the second partial electrodes and the second connection electrode;
   at least one of the first partial actuators is formed of a region where the first partial electrode and the third electrode overlap each other in the plan view; and
   at least one of the second partial actuators is formed of a region where the second partial electrode and the fourth electrode overlap each other in the plan view.

2. The variable wavelength interference filter according to claim 1, wherein
   the point is a center point of the optical interference region.

3. The variable wavelength interference filter according to claim 1, wherein
   the first actuator and the second actuator are disposed on a circumference of a circle having a center in the optical interference region in the plan view.

4. The variable wavelength interference filter according to claim 1, wherein
   the first partial actuators are each formed of either one of the region where the first partial electrode and the third electrode overlap each other in the plan view and a region where at least a part of the first connection electrode and the third electrode overlap each other in the plan view.

5. The variable wavelength interference filter according to claim 1, wherein
   the second partial actuators are each formed of either one of the region where the second partial electrode and the fourth electrode overlap each other in the plan view and a region where at least a part of the second connection electrode and the fourth electrode overlap each other in the plan view.

6. The variable wavelength interference filter according to claim 1, wherein
   the first partial actuators have an annular opposed region where a part of the first connection electrode and the third electrode overlap each other in the plan view, and
   the annular opposed region has an annular shape centered on the point of the optical interference region in the plan view.

7. The variable wavelength interference filter according to claim 1, wherein
   the second substrate includes:
      a movable section provided with the second reflecting film,
      a holding section disposed outside the movable section, and holding the movable section so as to be able to move back and forth with respect to the first substrate, and
      a substrate peripheral section disposed outside the holding section and having a bond region bonded to the first substrate, and a non-bond region opposed to the first substrate across a predetermined gap, and
   at least either one of the first connection electrode and the second connection electrode is disposed opposite to the non-bond region in the substrate peripheral section of the second substrate.

8. The variable wavelength interference filter according to claim 7, wherein
the third electrode is provided with:
a plurality of third partial electrodes disposed outside the optical interference region and overlapping the first partial electrodes in the plan view, and
a third connection electrode connecting the third partial electrodes to each other,
the fourth electrode is provided with:
a plurality of fourth partial electrodes disposed outside the optical interference region and overlapping the second partial electrodes in the plan view, and
a fourth connection electrode connecting the fourth partial electrodes to each other, and
at least either one of the third connection electrode and the fourth connection electrode is disposed in the non-bond region in the substrate peripheral section.

9. The variable wavelength interference filter according to claim 1, wherein
the third electrode is provided with:
a plurality of third partial electrodes disposed outside the optical interference region and overlapping the first partial electrodes in the plan view,
a third connection electrode connecting the third partial electrodes to each other, and
a third extraction electrode connected to at least one of the third partial electrodes and the third connection electrode,
the fourth electrode is provided with:
a plurality of fourth partial electrodes disposed outside the optical interference region and overlapping the second partial electrodes in the plan view,
a fourth connection electrode connecting the fourth partial electrodes to each other, and
a fourth extraction electrode connected to at least one of the fourth partial electrodes and the fourth connection electrode,
the first extraction electrode is disposed at a position that does not overlap the third extraction electrode and the fourth extraction electrode in the plan view, and
the second extraction electrode is disposed at a position that does not overlap the third extraction electrode and the fourth extraction electrode in the plan view.

10. The variable wavelength interference filter according to claim 1, wherein
the third electrode and the fourth electrode are formed of a continuous common electrode having an annular shape.

11. The variable wavelength interference filter according to claim 1, wherein
each of the first actuator and the second actuator are an electrostatic actuator.

12. An optical filter device comprising:
a variable wavelength interference filter including:
a first substrate including a first electrode and a second electrode,
a second substrate opposed to the first substrate, the second substrate including a third electrode and a fourth electrode, the third and fourth electrodes being opposed to the first and second electrodes, respectively
a first reflecting film provided to the first substrate,
a second reflecting film provided to the second substrate, and opposed to the first reflecting film across a gap,
a first actuator including the first electrode and the third electrode disposed outside an optical interference region where the first reflecting film and the second reflecting film overlap each other in a plan view of the first substrate and the second substrate, the first actuator selectively varying the gap between the first reflecting film and the second reflecting film, and
a second actuator including the second electrode and the fourth electrode disposed outside the optical interference region in the plan view, and varying the gap independently of the first actuator; and
a housing adapted to house the variable wavelength interference filter;
wherein the first actuator has a plurality of first partial actuators disposed at regular angular intervals with respect to a point in the optical interference region, the first partial actuators having the same shape as each other in the plan view and being disposed at the same distance from the point as each other;
the second actuator has a plurality of second partial actuators disposed at regular angular intervals with respect to the point in the optical interference region, the second partial actuators having the same shape as each other in the plan view and being disposed at the same distance from the point as each other;
the first electrode includes:
a plurality of first partial electrodes disposed outside the optical interference region in the plan view;
a first connection electrode connecting the first partial electrodes to each other; and
a first extraction electrode connected to at least one of the first partial electrodes and the first connection electrode;
the second electrode includes:
a plurality of second partial electrodes disposed outside the optical interference region in the plan view;
a second connection electrode connecting the second partial electrodes to each other; and
a second extraction electrode connected to at least one of the second partial electrodes and the second connection electrode;
at least one of the first partial actuators is formed of a region where the first partial electrode and the third electrode overlap each other in the plan view; and
at least one of the second partial actuators is formed of a region where the second partial electrode and the fourth electrode overlap each other in the plan view.

13. A variable wavelength interference filter comprising:
a first substrate;
a second substrate opposed to the first substrate;
a first reflecting film provided to the first substrate;
a second reflecting film provided to the second substrate, and opposed to the first reflecting film across a gap;
a first actuator disposed outside an optical interference region where the first reflecting film and the second reflecting film overlap each other in a plan view of the first substrate and the second substrate, the first actuator including a first electrode formed on the first substrate and a second electrode formed on the second substrate that faces the first electrode, the first actuator selectively varying the film gap between the first reflecting film and the second reflecting film; and
a second actuator disposed outside the optical interference region in the plan view, and driven independently of the first actuator to vary the gap, the second actuator including a third electrode on the first substrate and a fourth electrode that faces the third electrode on the second substrate,
wherein the first actuator and the second actuator are disposed on a circumference of a circle having a center in the optical interference region in the plan view, the first electrode includes:
- a plurality of first partial electrodes disposed outside the optical interference region in the plan view;
- a first connection electrode connecting the first partial electrodes to each other; and
- a first extraction electrode connected to at least one of the first partial electrodes and the first connection electrode;

the second electrode includes:
- a plurality of second partial electrodes disposed outside the optical interference region in the plan view;
- a second connection electrode connecting the second partial electrodes to each other; and
- a second extraction electrode connected to at least one of the second partial electrodes and the second connection electrode;

at least one of the first partial actuators is formed of a region where the first partial electrode and the third electrode overlap each other in the plan view; and at least one of the second partial actuators is formed of a region where the second partial electrode and the fourth electrode overlap each other in the plan view.

14. A variable wavelength interference filter comprising:
a first electrode and a second electrode;
a third electrode and a fourth electrode, the third electrode and the fourth electrode being opposed to the first electrode and the second electrode, respectively, across a gap;
a first reflecting film;
a second reflecting film opposed to the first reflecting film across the gap;
a first actuator including the first electrode and the third electrode disposed outside an optical interference region where the first reflecting film and the second reflecting film overlap each other in a plan view, the first actuator selectively varying the gap between the first reflecting film and the second reflecting film; and
a second actuator including the second electrode and the fourth electrode disposed outside the optical interference region in the plan view, and driven independently of the first actuator to vary the gap;
wherein the first actuator has a plurality of first partial actuators disposed at regular angular intervals with respect to a point in the optical interference region, the first partial actuators having the same shape as each other in the plan view and being disposed at the same distance from the point as each other;
the second actuator has a plurality of second partial actuators disposed at regular angular intervals with respect to the point in the optical interference region, the second partial actuators having the same shape as each other in the plan view and being disposed at the same distance from the point as each other;

the first electrode includes:
- a plurality of first partial electrodes disposed outside the optical interference region in the plan view;
- a first connection electrode connecting the first partial electrodes to each other; and
- a first extraction electrode connected to at least one of the first partial electrodes and the first connection electrode;

the second electrode includes:
- a plurality of second partial electrodes disposed outside the optical interference region in the plan view;
- a second connection electrode connecting the second partial electrodes to each other; and
- a second extraction electrode connected to at least one of the second partial electrodes and the second connection electrode;

at least one of the first partial actuators is formed of a region where the first partial electrode and the third electrode overlap each other in the plan view; and at least one of the second partial actuators is formed of a region where the second partial electrode and the fourth electrode overlap each other in the plan view.

* * * * *